US008730584B2

(12) United States Patent
Ito

(10) Patent No.: US 8,730,584 B2
(45) Date of Patent: May 20, 2014

(54) VARIABLE MAGNIFICATION OPTICAL SYSTEM, OPTICAL APPARATUS PROVIDED WITH SAME AND METHOD FOR VARIABLE MAGNIFICATION USING VARIABLE MAGNIFICATION OPTICAL SYSTEM

(75) Inventor: Tomoki Ito, Kawasaki (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/054,060

(22) PCT Filed: Jul. 9, 2009

(86) PCT No.: PCT/JP2009/062532
§ 371 (c)(1),
(2), (4) Date: Jan. 13, 2011

(87) PCT Pub. No.: WO2010/007939
PCT Pub. Date: Jan. 21, 2010

(65) Prior Publication Data
US 2011/0122506 A1    May 26, 2011

(30) Foreign Application Priority Data
Jul. 15, 2008   (JP) ................. 2008-183613

(51) Int. Cl.
*G02B 15/14*    (2006.01)
(52) U.S. Cl.
USPC ............................................ 359/676
(58) Field of Classification Search
USPC ................... 359/676–679, 683–685
See application file for complete search history.

(56) References Cited

U.S. PATENT DOCUMENTS

| 5,388,004 | A  | 2/1995  | Adachi |
|-----------|----|---------|--------|
| 5,654,826 | A  | 8/1997  | Suzuki |
| 5,835,282 | A  | 11/1998 | Suenaga et al. |
| 6,989,942 | B1 | 1/2006  | Nurishi |
| 7,253,962 | B2 | 8/2007  | Sano |
| 7,312,934 | B2* | 12/2007 | Iwasawa ............... 359/764 |

(Continued)

FOREIGN PATENT DOCUMENTS

| CN | 101196611 A | 11/2008 |
| JP | 59-052215 A | 3/1984 |

(Continued)

OTHER PUBLICATIONS

English Translation of International Search Report from International Application No. PCT/JP2009/062532.

(Continued)

*Primary Examiner* — Darryl J Collins
(74) *Attorney, Agent, or Firm* — Miles & Stockbridge P.C.

(57) ABSTRACT

A variable magnification optical system ZL to be mounted on an electronic still camera 1 or the like is configured to have, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power, and configured in such a manner that, in variable magnification, the first lens unit G1 is fixed, that, in focusing, the third lens unit G3 moves, and that at least a part of the fifth lens unit G5 moves so as to have a component in a substantially orthogonal direction to the optical axis.

24 Claims, 22 Drawing Sheets

(56) References Cited

U.S. PATENT DOCUMENTS

| | | | |
|---|---|---|---|
| 7,369,313 B2 | 5/2008 | Otake | |
| 7,372,635 B2 | 5/2008 | Morooka et al. | |
| 7,502,171 B2 | 3/2009 | Morooka et al. | |
| 7,511,898 B2 * | 3/2009 | Matsui | 359/758 |
| 2007/0236806 A1 * | 10/2007 | Ori | 359/686 |
| 2010/0214658 A1 | 8/2010 | Ito | |

FOREIGN PATENT DOCUMENTS

| | | |
|---|---|---|
| JP | 03-006510 A | 1/1991 |
| JP | 5-215967 A | 8/1993 |
| JP | 06-148523 A | 5/1994 |
| JP | 08-278445 A | 10/1996 |
| JP | 9-325274 A | 12/1997 |
| JP | 10-148757 A | 6/1998 |
| JP | 2002-98895 A | 4/2002 |
| JP | 2002-162563 A | 6/2002 |
| JP | 2002-228931 A | 8/2002 |
| JP | 2005-121694 A | 5/2005 |
| JP | 2005-345714 A | 12/2005 |
| JP | 2006-003913 A | 1/2006 |
| JP | 2006-201524 A | 8/2006 |
| JP | 2006-209100 A | 8/2006 |
| JP | 2006-215257 A | 8/2006 |
| JP | 2006-330341 A | 12/2006 |
| JP | 2007-003598 A | 1/2007 |
| JP | 2007-108702 A | 4/2007 |
| JP | 2007-108714 A | 4/2007 |
| JP | 2005-195757 A | 7/2007 |
| JP | 2008-145529 A | 6/2008 |

OTHER PUBLICATIONS

English Translation of International Preliminary Report on Patentability from International Application No. PCT/JP2009/062532.
Office Action issued Jun. 8, 2012 in U.S. Appl. No. 12/708,951.
Office Action issued Feb. 13, 2014, in Japanese Patent Application No. 2009-162469.

* cited by examiner

Fig.2
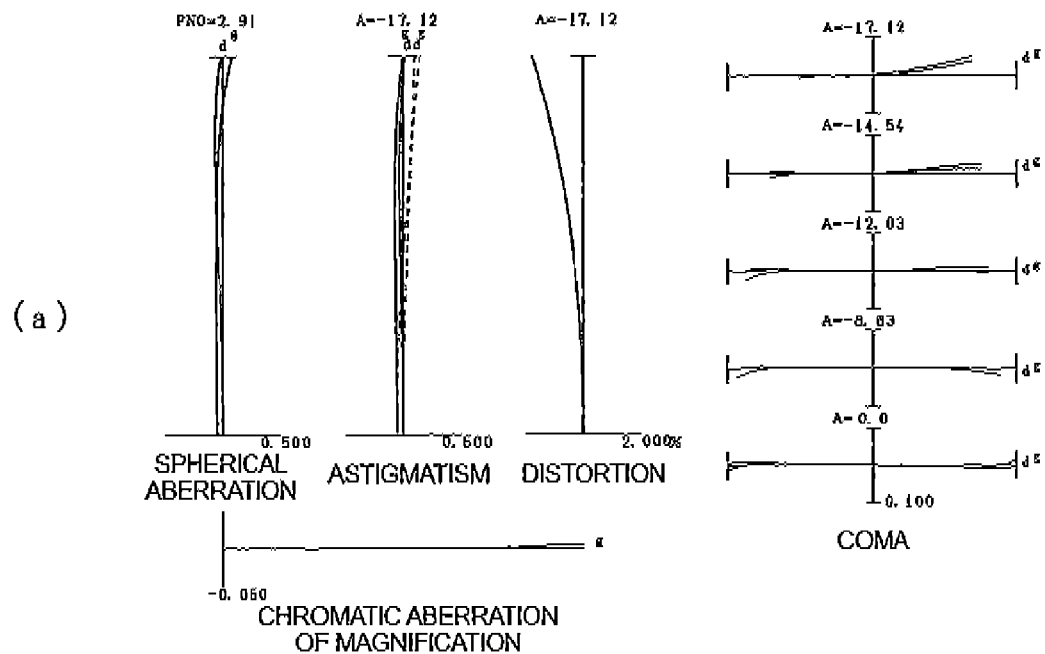
(a)
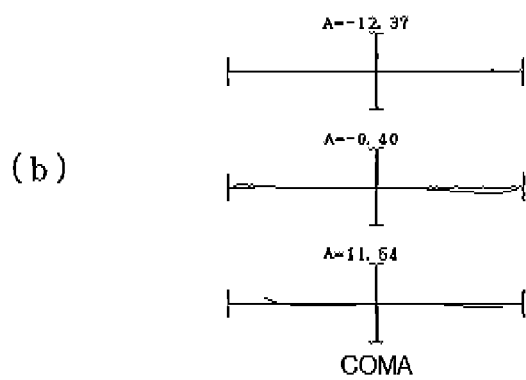
(b)

Fig.4
(a)
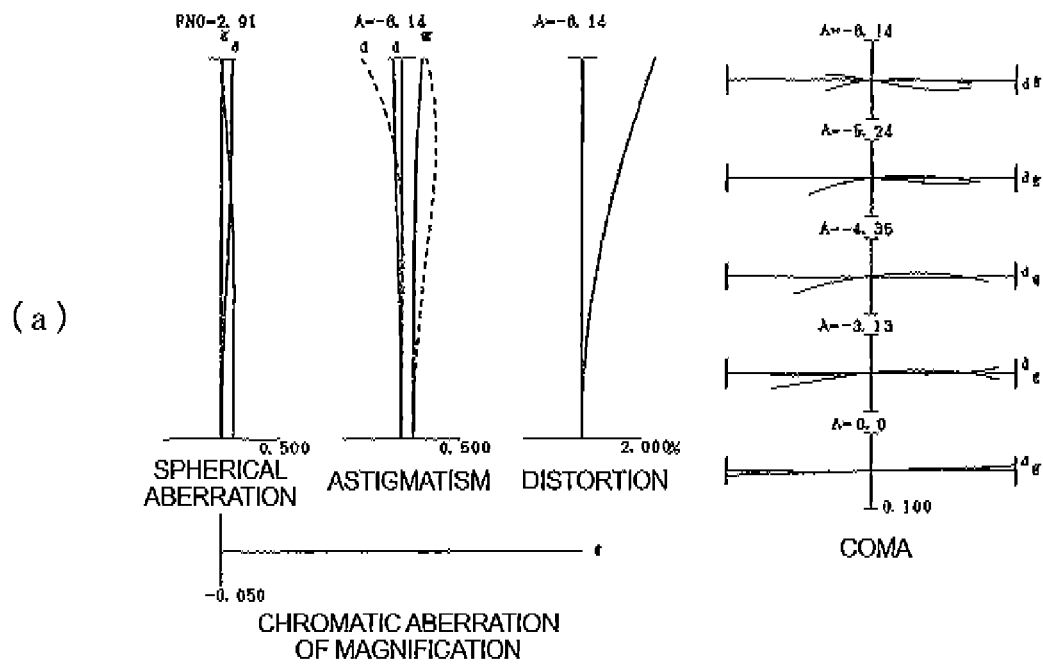
(b)
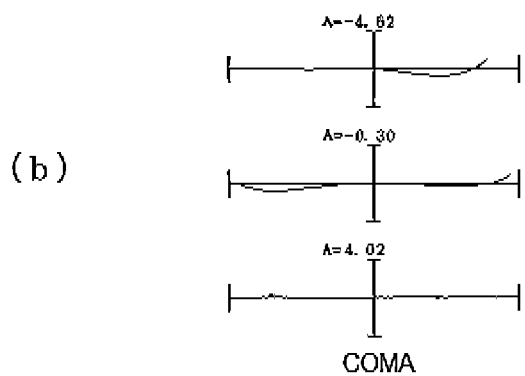

*Fig.7*
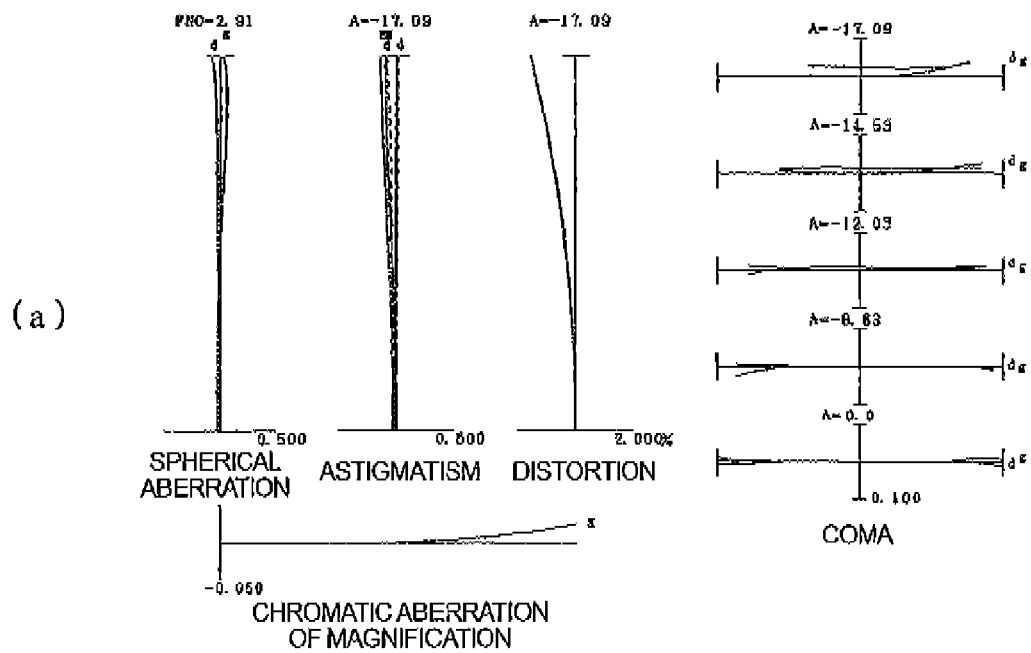
(a)
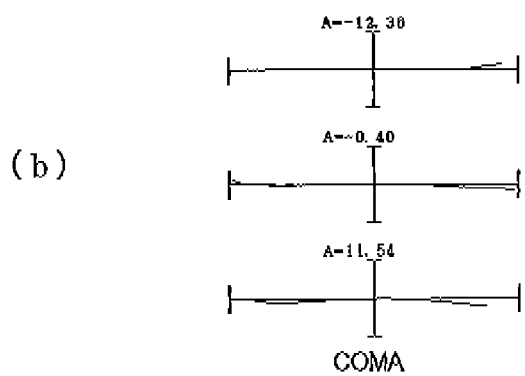
(b)

Fig.9
(a)
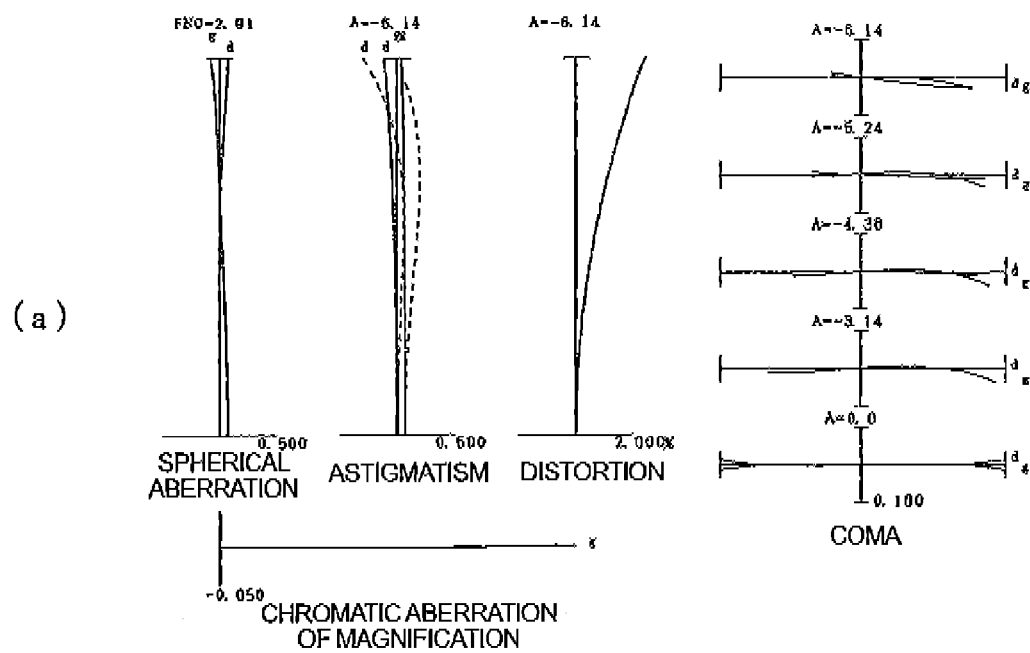
(b)
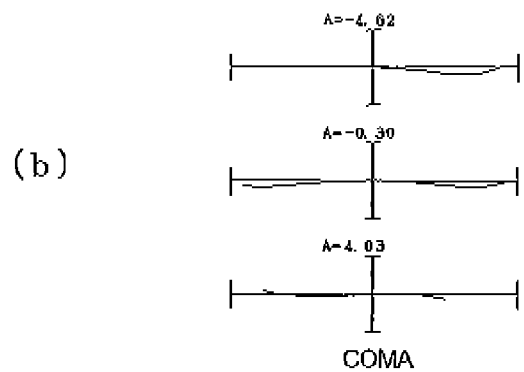

Fig.12
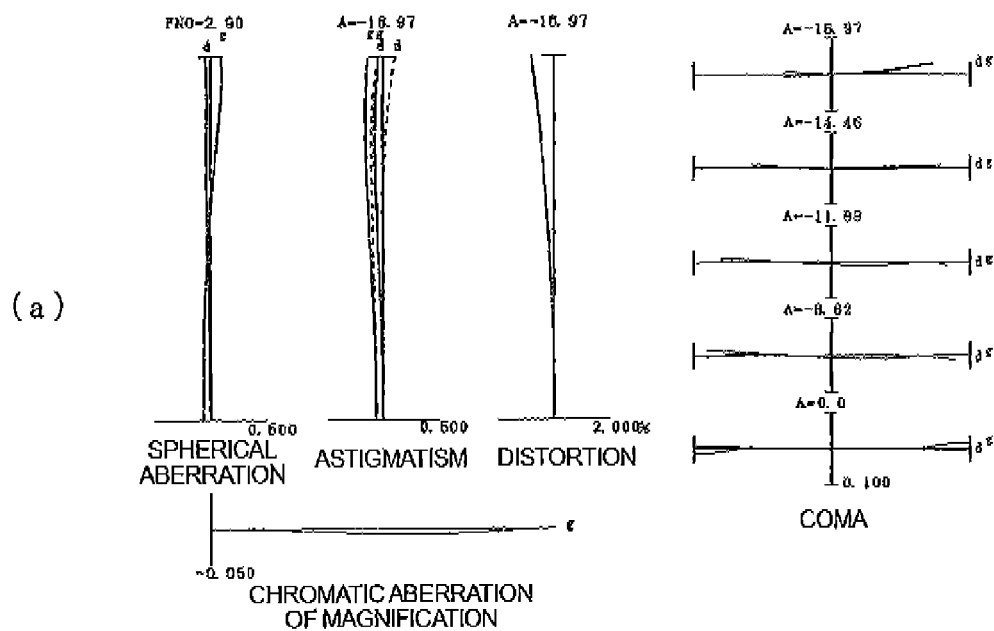
(a)
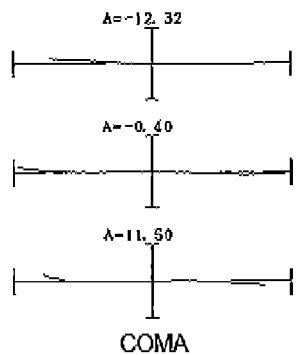
(b)

Fig.14
(a)
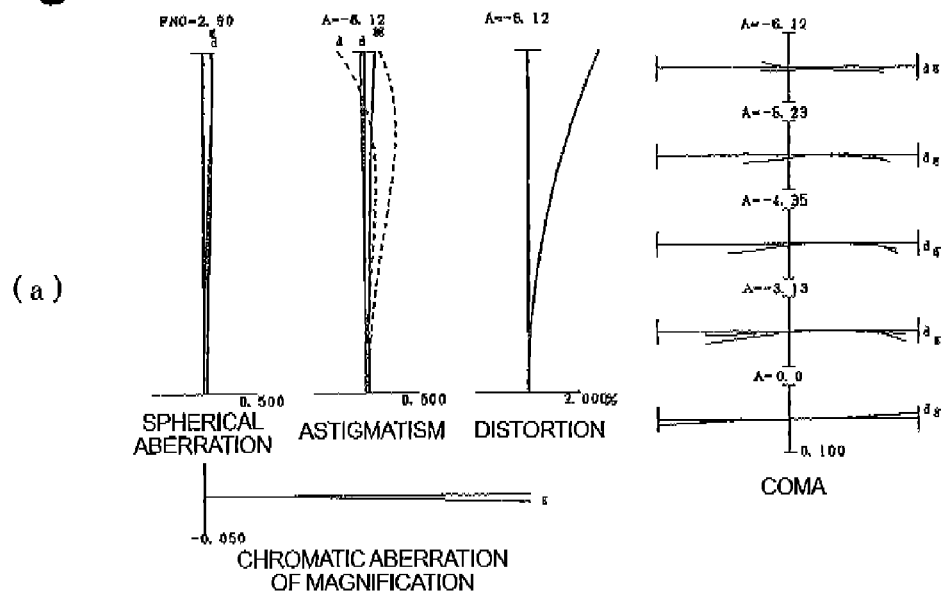
(b)
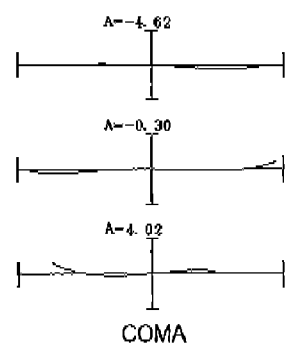

Fig.19
(a)
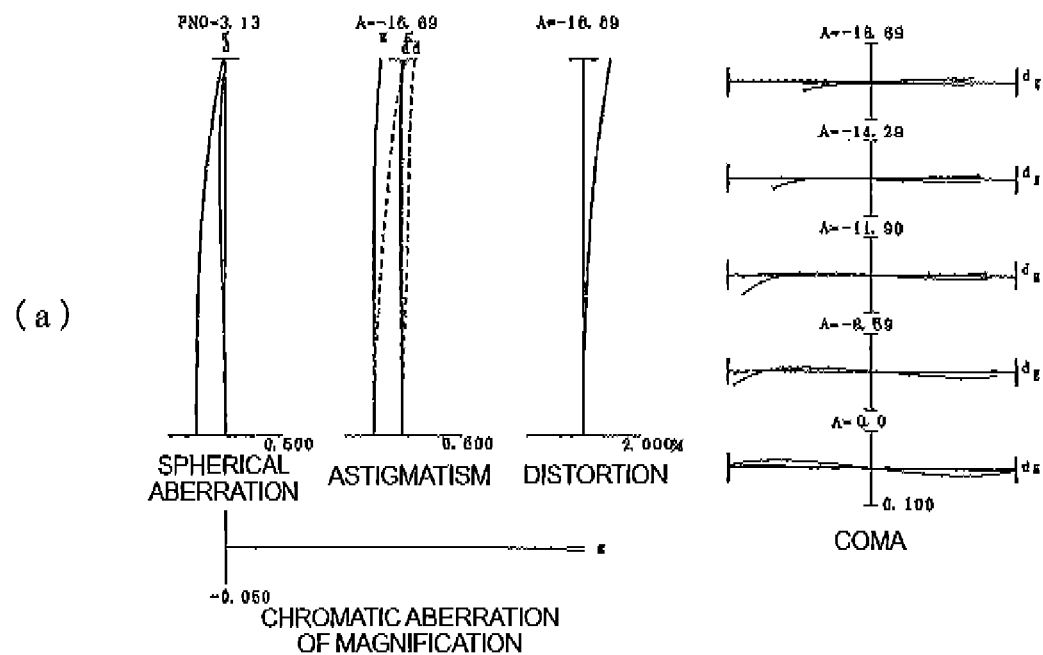
(b)
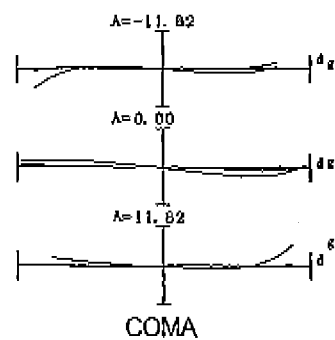

Fig.21
(a)
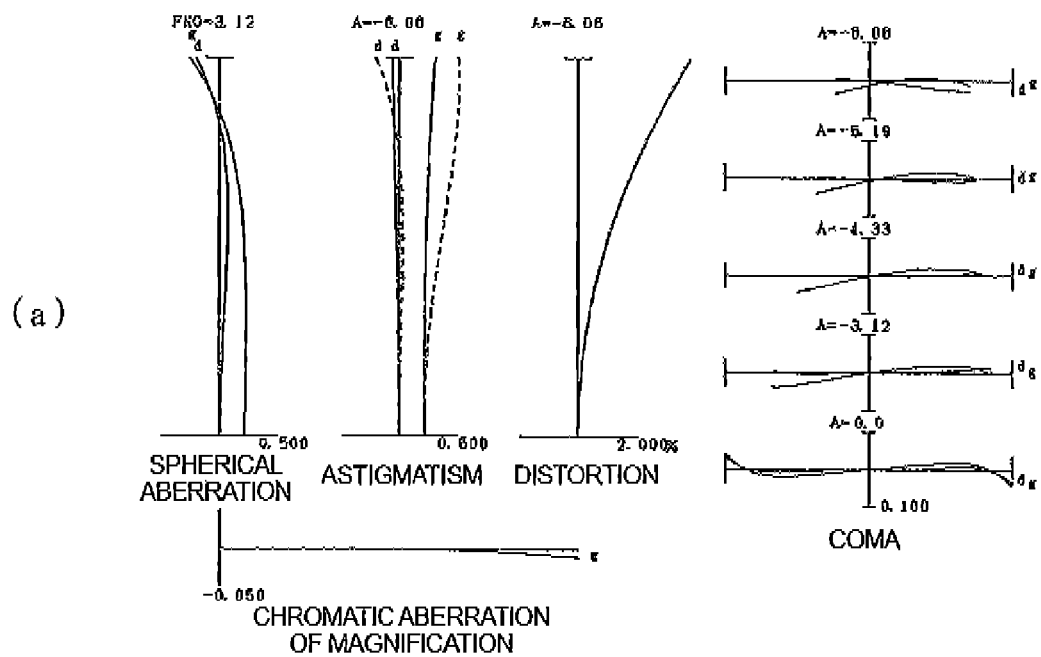
(b)
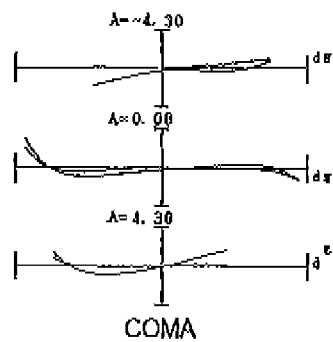

VARIABLE MAGNIFICATION OPTICAL SYSTEM, OPTICAL APPARATUS PROVIDED WITH SAME AND METHOD FOR VARIABLE MAGNIFICATION USING VARIABLE MAGNIFICATION OPTICAL SYSTEM

TECHNICAL FIELD

The present invention relates to a variable magnification optical system, an optical apparatus provided with the variable magnification optical system, and a method for variable magnification using the variable magnification optical system.

BACKGROUND ART

There are hitherto-proposed variable magnification optical systems suitable for photographic cameras, electronic still cameras, video cameras, and so on (e.g., cf. Patent Literature 1).

CITATION LIST

Patent Literature

Patent Literature 1: Japanese Patent Application Laid-open No. 2006-201524

SUMMARY OF INVENTION

Technical Problem

However, the conventional variable magnification optical systems had a problem that they failed to deal with a compensation matter for camera shake.

The present invention has been accomplished in view of this problem and it is an object of the present invention to provide a variable magnification optical system with optical performance capable of dealing with the compensation matter for camera shake, an optical apparatus provided with the variable magnification optical system, and a method for variable magnification using the variable magnification optical system.

Solution to Problem

In order to solve the above problem, a variable magnification optical system according to the first aspect of the present invention is a variable magnification optical system comprising: a first lens unit with a positive refractive power arranged nearest to an object; a second lens unit arranged on the image plane side of the first lens unit; a $G_n$ lens unit arranged nearest to the image plane; a $G_{n-1}$ lens unit arranged on the object side of the $G_n$ lens unit; and at least one lens unit arranged between the second lens unit and the $G_{n-1}$ lens unit, wherein, in variable magnification, the first lens unit and the $G_n$ lens unit are fixed, wherein, in focusing, at least one lens unit arranged between the second lens unit and the $G_{n-1}$ lens unit moves, and wherein at least a part of the $G_n$ lens unit moves so as to have a component in a substantially orthogonal direction to the optical axis.

This variable magnification optical system preferably satisfies a condition of the following expression:

$$0.5 < |fG_{n-1}|/fw < 5.0,$$

where $fG_{n-1}$ is the focal length of the $G_{n-1}$ lens unit and fw the focal length of the entire system in a wide-angle end state.

This variable magnification optical system preferably comprises, in order from the object side, the first lens unit, the second lens unit, a third lens unit, a fourth lens unit, and a fifth lens unit.

A variable magnification optical system according to the second aspect of the present invention, is a variable magnification optical system comprising, in order from the object side: a first lens unit having a positive refractive power; a second lens unit having a negative refractive power; a third lens unit having a positive refractive power; a fourth lens unit having a negative refractive power; and a fifth lens unit having a positive refractive power, wherein, in variable magnification, the first lens unit is fixed, wherein, in focusing, the third lens unit moves, and wherein at least a part of the fifth lens unit moves so as to have a component in a substantially orthogonal direction to the optical axis.

This variable magnification optical system is preferably configured so that, in variable magnification, the fifth lens unit is fixed.

This variable magnification optical system preferably satisfies a condition of the following expression:

$$0.5 < |fG_{n-1}|/fw < 5.0,$$

where $fG_{n-1}$ is the focal length of the fourth lens unit and fw the focal length of the entire system in a wide-angle end state.

In this variable magnification optical system, preferably, the fourth lens unit consists of a lens component.

In this variable magnification optical system, preferably, the fourth lens unit consists of a negative meniscus lens.

A variable magnification optical system according to the third aspect of the present invention is a variable magnification optical system comprising, in order from the object side: a first lens unit having a positive refractive power; a second lens unit having a negative refractive power; a third lens unit having a positive refractive power; and a fourth lens unit having a positive refractive power, wherein the third lens unit comprises, in order from the object side, a front partial lens unit, and a rear partial lens unit arranged with an air space to the front partial lens unit, wherein, in variable magnification, the first lens unit and the fourth lens unit are fixed and the air space between the front partial lens unit and the rear partial lens unit varies, wherein, in focusing, at least one of the front partial lens unit and the rear partial lens unit moves, and wherein at least a part of the fourth lens unit moves so as to have a component in a substantially orthogonal direction to the optical axis.

An optical apparatus according to the present invention, comprises any one of the above-described variable magnification optical systems.

A magnification varying method of a variable magnification optical system according to the present invention is a method for variable magnification using a variable magnification optical system comprising: a first lens unit with a positive refractive power arranged nearest to an object; a second lens unit arranged on the image plane side of the first lens unit; a $G_n$ lens unit which is arranged nearest to the image plane and at least a part of which moves so as to have a component in a substantially orthogonal direction to the optical axis; a $G_{n-1}$ lens unit arranged on the object side of the $G_n$ lens unit; and a focusing lens unit arranged between the second lens unit and the $G_{n-1}$ lens unit, the method comprising: fixing the first lens unit and the lens unit; and moving at least one lens unit arranged between the first lens unit and the $G_n$ lens unit.

Advantageous Effects of Invention

When the variable magnification optical system, the optical apparatus with the variable magnification optical system, and the method for variable magnification using the variable magnification optical system according to the present invention are configured as described above, they achieve the optical performance capable of dealing with the compensation matter for camera shake.

BRIEF DESCRIPTION OF DRAWINGS

FIG. 2 is aberration diagrams in the infinity in-focus state in the first example, wherein (a) is aberration diagrams in the wide-angle end state and (b) a meridional transverse aberration diagram with a movement compensation for rotational movement of 0.40° in the infinity photography state in the wide-angle end state.

FIG. 4 is aberration diagrams in the infinity in-focus state in the first example, wherein (a) is aberration diagrams in the telephoto end state and (b) a meridional transverse aberration diagram with a movement compensation for rotational movement of 0.30° in the infinity photography state in the telephoto end state.

FIG. 7 is aberration diagrams in the infinity in-focus state in the second example, wherein (a) is aberration diagrams in the wide-angle end state and (b) a meridional transverse aberration diagram with a movement compensation for rotational movement of 0.40° in the infinity photography state in the wide-angle end state.

FIG. 9 is aberration diagrams in the infinity in-focus state in the second example, wherein, (a) is aberration diagrams in the telephoto end state and (b) a meridional transverse aberration diagram with a movement compensation for rotational movement of 0.30° in the infinity photography state in, the telephoto end state.

FIG. 12 is aberration diagrams in the infinity in-focus state in the third example, wherein (a) is aberration diagrams in the wide-angle end state and (b) a meridional transverse aberration diagram with a movement compensation for rotational movement of 0.40° in the infinity photography state in the wide-angle end state.

FIG. 14 is aberration diagrams in the infinity in-focus state in the third example, wherein (a) is aberration diagrams in the telephoto end state and (b) a meridional transverse aberration diagram with a movement compensation for rotational movement of 0.30° in the infinity photography state in the telephoto end state.

FIG. 19 is aberration diagrams in the infinity in-focus state in the fourth example, wherein (a) is aberration diagrams in the wide-angle end state and (b) a meridional transverse aberration diagram with a movement compensation for rotational movement of 0.40° in the infinity photography state in the wide-angle end state.

FIG. 21 is aberration diagrams in the infinity in-focus state in the fourth example, wherein (a) is aberration diagrams in the telephoto end state and (b) a meridional transverse aberration diagram with a movement compensation for rotational movement of 0.30° in the infinity photography state in the telephoto end state.

DESCRIPTION OF EMBODIMENTS

Figure 1:
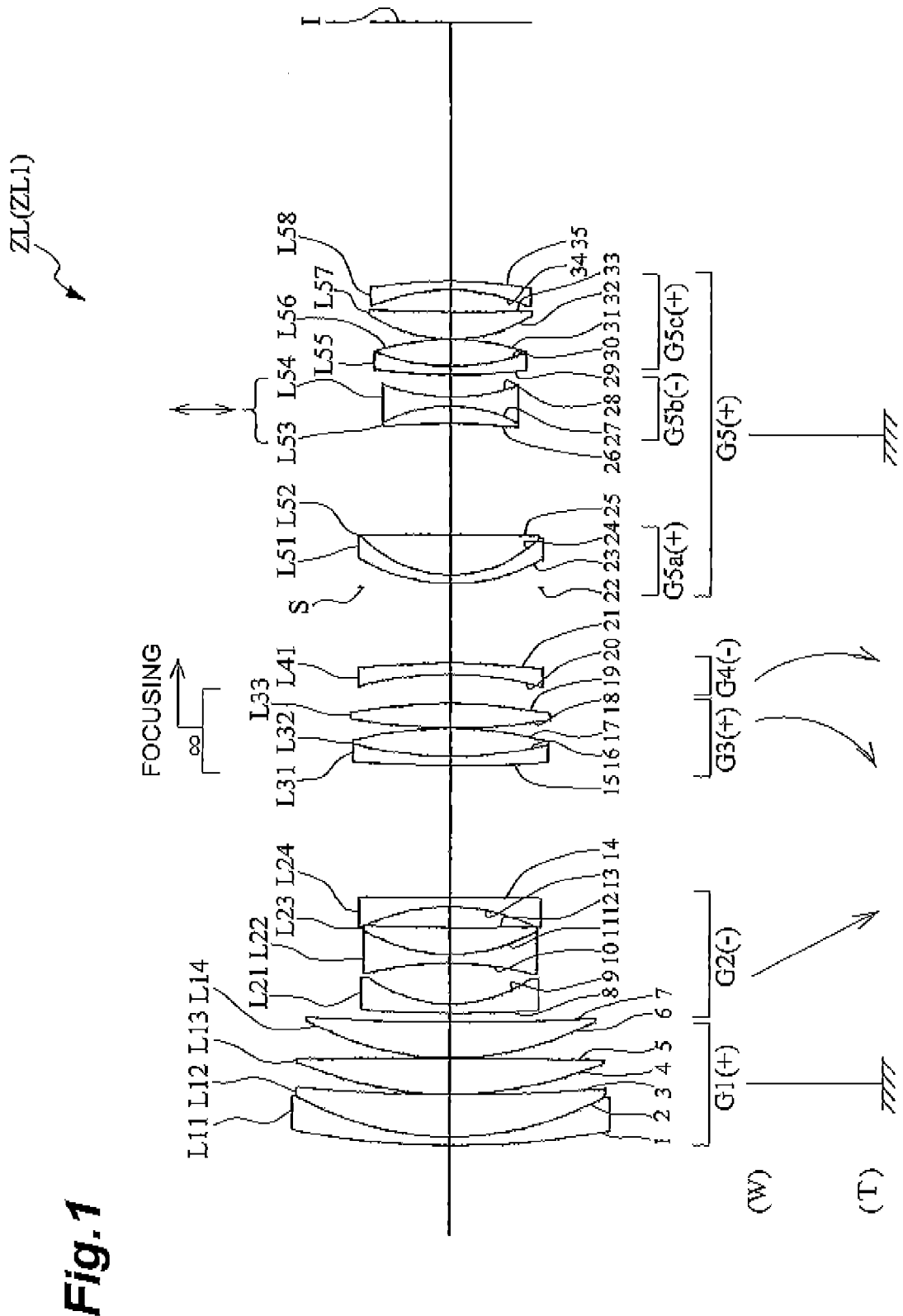
FIG. 1 is a cross-sectional view showing a configuration of a variable magnification optical system according to the first example.
Figure 18:
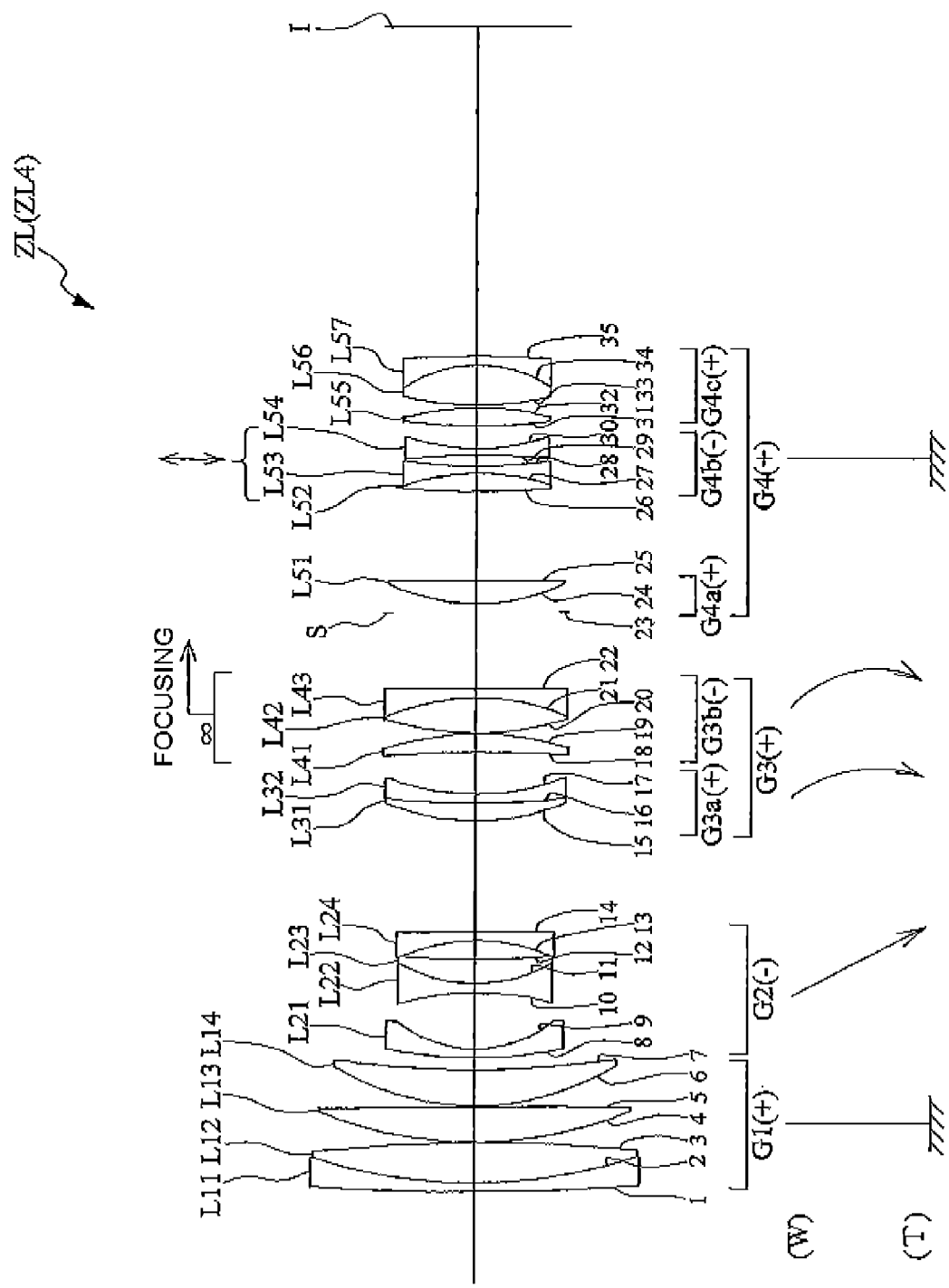
FIG. 18 is a cross-sectional view showing a configuration of a variable magnification optical system according to the fourth example.

A preferred embodiment of the present invention will be described below with reference to the drawing. As shown in FIG. 1, a variable magnification optical system ZL according to the present embodiment is configured to have, in order from the object side, a first lens unit G1 having a positive refractive power, a second lens unit G2 having a negative refractive power, a third lens unit G3 having a positive refractive power, a fourth lens unit G4 having a positive refractive power, and a fifth lens unit G5 having a positive refractive power. When the optical system is configured in this manner, it achieves downsizing of the entire lens cylinder. The variable magnification optical system ZL may be configured in the following configuration as shown in FIG. 18: it has, in order from the object side, a first lens unit G1 having a positive refractive power, a second lens unit G2 having a negative refractive power, a third lens unit G3 having a positive refractive power, and a fourth lens unit G4 having a positive refractive power; an air space between a front partial lens unit and a rear partial lens unit of the third lens unit G3 varies in variable magnification.

This variable magnification optical system ZL is desirably configured so that the first lens unit G1 is fixed during change in lens position state from the wide-angle end state to the telephoto end state. This is advantageous in simplification of a zoom mechanism.

This variable magnification optical system ZL is desirably configured so that the $G_n$ lens unit $G_n$ arranged nearest to the image plane is fixed during the change in lens position state from the wide-angle end state to the telephoto end state. This configuration enables simplification of the zoom mechanism of the variable magnification optical system ZL. When an aperture stop S is arranged in or near the $G_n$ lens unit $G_n$ and when the $G_n$ lens unit $G_n$ and the aperture stop S are fixed during the change in lens position state from the wide-angle end state to the telephoto end state, the F-number can be made constant. When the first lens unit G1 and the $G_n$ lens unit $G_n$ are fixed during the change in lens position state from the wide-angle end state to the telephoto end state, the overall length of the variable magnification optical system ZL can be kept constant.

Focusing from a far object to a near object is preferably implemented by moving the third lens unit G3 (or at least one of the front partial lens unit and the rear partial lens unit in the third lens unit). The third lens unit G3 (or at least one of the front partial lens unit and the rear partial lens unit in the third lens unit) is suitable for execution of focusing because it has the number of lenses and the outside diameter smaller than those of the other lens units. This configuration also achieves good optical performance in near object photography, without change in the overall length during focusing.

In the variable magnification optical system ZL as described above, compensation for camera shake is preferably implemented by moving at least a part of the $G_n$ lens unit $G_n$ so as to have a component in a substantially orthogonal direction to the optical axis. This configuration enables downsizing and weight reduction of a camera shake compensating mechanism. Such movement as to have a component in a substantially orthogonal direction to the optical axis includes movement in the orthogonal direction to the optical axis, movement in an oblique direction to the optical axis, and rotational movement around a point on the optical axis as a center of rotation.

In this variable magnification optical system ZL, preferably, the fourth lens unit G4 (or, where one of the front partial lens unit and the rear partial lens unit in the third lens unit is defined as a focusing lens unit, the other lens unit) consists of a lens component. This configuration relaxes decentering coma and field tilt which can occur with decentering due to manufacturing errors.

In this case, the fourth lens G4 unit (or, where one of the front partial lens unit and the rear partial lens unit in the third lens unit is defined as a focusing lens unit, the other lens unit) preferably consists of a negative meniscus lens. This configuration enables effective correction for spherical aberration and chromatic aberration at the telephoto end.

Now, let us explain a condition for configuring the variable magnification optical system ZL as described above. First, when the variable magnification optical system ZL has the lens units from the first lens unit G1 to the $G_n$ lens unit $G_n$, it preferably satisfies Condition (1) below where $fG_{n-1}$ is the focal length of the $G_{n-1}$ lens unit $G_{n-1}$ and fw the focal length of the entire system in a wide-angle end state. In the present embodiment, since the lens units are arranged in a five-unit configuration (n=5), the $G_{n-1}$ lens unit $G_{n-1}$ represents the fourth lens unit G4 and $fG_{n-1}$ the focal length of the fourth lens unit G4.

$$0.5 < |fG_{n-1}|/fW < 5.0 \qquad (1)$$

Condition (1) defines the focal length of the $G_{n-1}$ lens unit $G_{n-1}$ (the fourth lens unit G4 in the present embodiment) to the focal length of the entire system in a wide-angle end state of variable magnification optical system ZL. If the ratio is over the upper limit of this Condition (1), the refractive power of the fourth lens unit G4 will become too weak to suppress variation in spherical aberration during variation in magnification; therefore, it is unpreferable. On the other hand, if the ratio is below the lower limit of Condition (1), the refractive power of the fourth lens unit G4 will become too strong to correct for chromatic aberration. In addition, it is also unpreferable because it increases the amount of decentering coma occurring with decentering due to manufacture errors. When the upper limit of Condition, (1) is set to 3.5 and the lower limit thereof to 1.5, the effect of the present invention can be made more definite.

Figure 16:
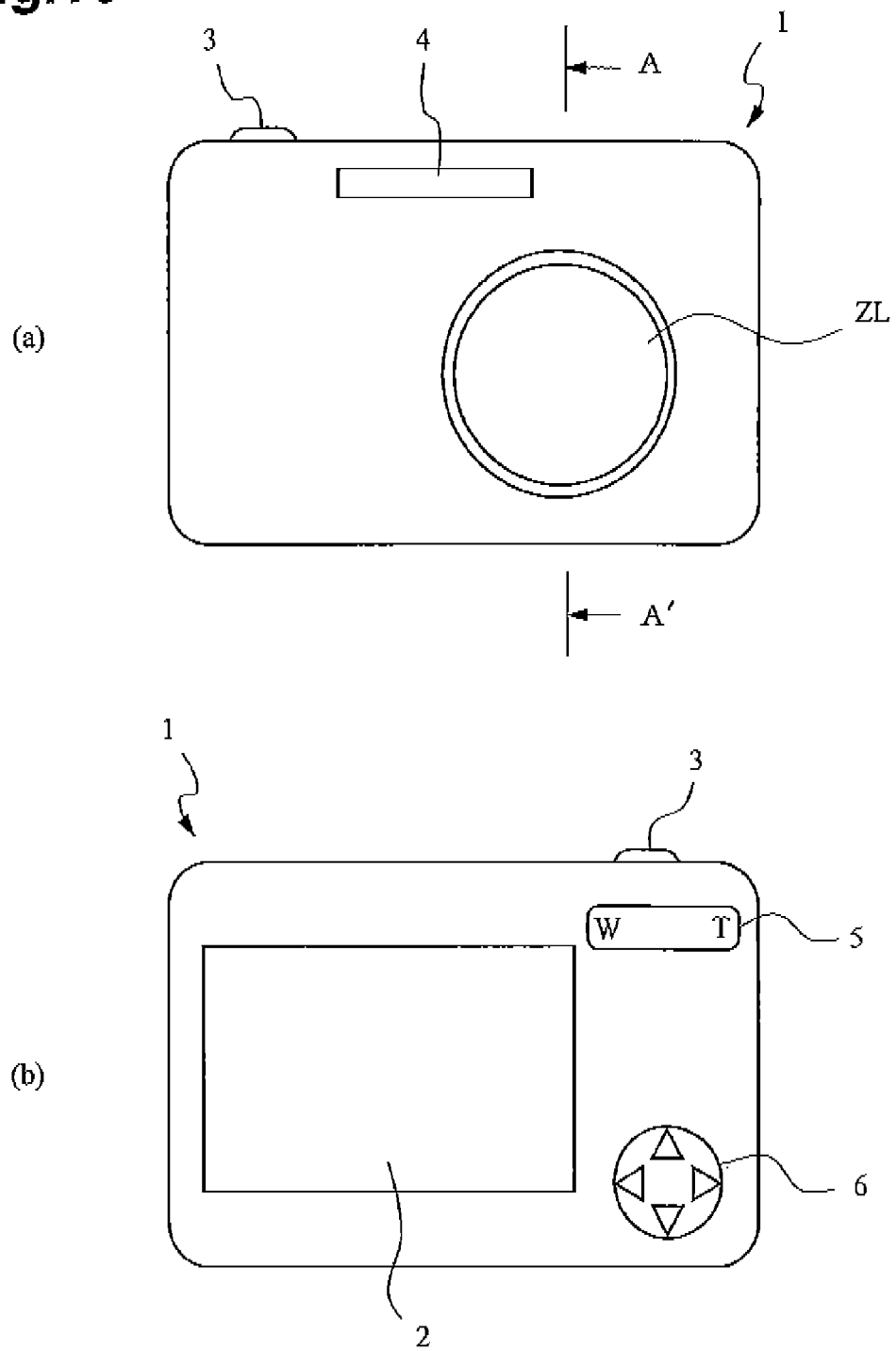
FIG. 16 shows an electronic still camera loaded with a variable magnification optical system according to the present invention, wherein (a) is a front view and (b) a back view.
Figure 17:
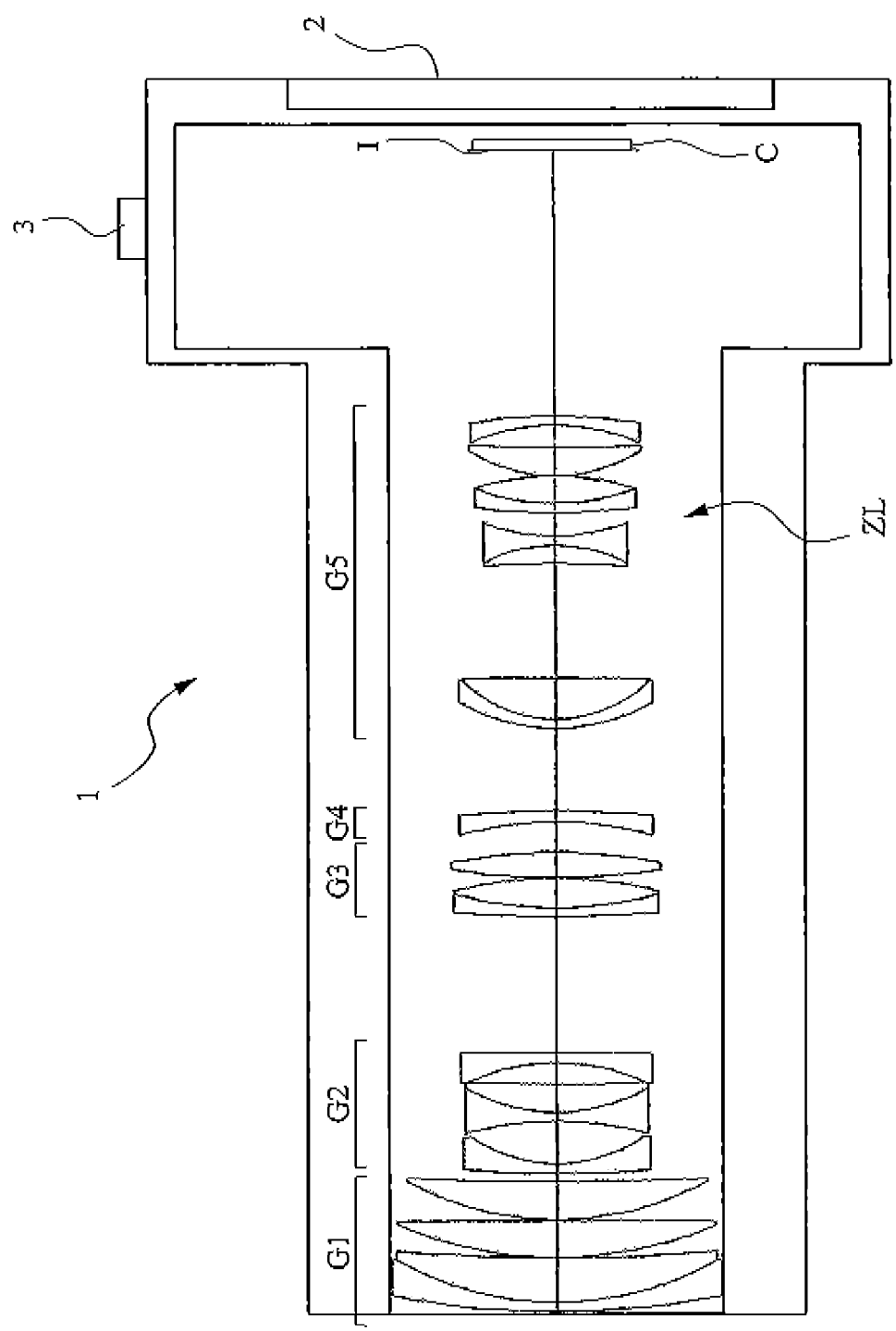
FIG. 17 is a cross-sectional view along line A-A' of FIG. 16 (a).

FIGS. 16 and 17 show a configuration of an electronic still camera 1 (which will be referred to simply as a camera) as an optical apparatus provided with the aforementioned variable magnification optical system ZL. This camera 1 is configured as follows: when an unillustrated power button is pushed, an unillustrated shutter of a taking lens (variable magnification optical system ZL) becomes opened; the variable magnification optical system ZL focuses light from an unillustrated subject to form an image thereof on an imaging device C (e.g., CCD, CMOS, or the like) arranged on the image plane I. The subject image formed on the imaging device C is displayed on a liquid crystal monitor 2 arranged on the back of the camera 1. A photographer determines a composition of the subject image while watching the liquid crystal monitor 2; then the photographer depresses a release button 3 to take the subject image by the imaging device C; the image is recorded and stored in an unillustrated memory.

This camera 1 is provided with an auxiliary light emitter 4 to emit auxiliary light for a dark subject, a wide (W)-tele (T) button 5 for zooming of the variable magnification optical system ZL from the wide-angle end state (W) to the telephoto end state (T), a function button 6 to be used, for example, to set various conditions of the camera 1, and so on. This camera 1 may be a so-called single lens reflex camera provided with a half mirror, a focusing glass, a pentagonal prism, an eyepiece optical system, and so on. The variable magnification optical system ZL may be configured so as to be set in an interchangeable lens which can be detachably mounted on a single lens reflex camera.

The contents described below can be optionally adopted as long as the optical performance is not degraded.

First, the above description and examples provided below show the variable magnification optical systems ZL of the five-unit configuration, but the above configurational conditions and others can also be applied to the other unit configurations such as six-unit and seven-unit configurations. Specifically, exemplary configurations include a configuration wherein at least one lens with a positive refractive index is added nearest to the object, a configuration wherein at least one lens with a positive refractive index or with a negative refractive index is added nearest to the image, and a configuration wherein three or more lens units are arranged between the second lens unit G2 and the fifth lens unit G5.

Furthermore, the above description concerned the case where the third lens unit G3 was used for focusing, but, without having to be limited to this third lens unit G3, the focusing lens unit for focusing from an infinity object to a near object may be one configured so as to move a single lens unit or a plurality of lens units, or a partial lens unit in the optical-axis direction. In this case, the focusing lens unit may also be applied to autofocus and is also suitable for driving with a motor (such as an ultrasonic motor) for autofocus. Particularly, it is preferable to configure the third lens unit G3 as a focusing lens unit as described above, but it is also possible to achieve focusing by the fourth lens unit G4.

In this variable magnification optical system ZL, a lens surface may be made as an aspherical surface. In this case, the aspherical surface may be an aspherical surface made by grinding, a glass mold aspherical surface molded in an aspherical shape of glass, or a composite aspherical surface obtained by forming a resin in an aspherical shape on a surface of glass. Furthermore, a lens surface may be made as a diffractive surface, and a lens may be made as a gradient index lens (GRIN lens) or a plastic lens.

The aperture stop S is preferably arranged near or in the fifth lens unit G5 as described above, but a lens frame may be used instead thereof so as to serve as an aperture stop, without provision of an extra member as the aperture stop S.

Furthermore, each lens surface may be provided with an antireflection coating having high transmittance over a wide wavelength range, thereby reducing flare and ghost and achieving high optical performance with high contrast.

The variable magnification optical system ZL of the present embodiment has the 35 mm equivalent focal length of about 60-80 mm in the wide-angle end state and about 180-400 mm in the telephoto end state, and the variable magnification ratio of about 2-5.

In the variable magnification optical system ZL of the present embodiment, preferably, the first lens unit G1 has at least two positive lens components and one negative lens component. The first lens unit G1 is preferably configured so that the lens components are arranged in the order of negative, positive, and positive from the object side. All these positive lens components are preferably single lenses. The negative lens component is preferably a cemented lens. The first lens unit G1 is configured without any path bending element such as a rectangular prism. The first lens unit G1 is preferably composed of the lens components having at least one spherical surface or aspherical surface, or composed of the lens components and a plane-parallel plate which transmits rays.

In the variable magnification optical system ZL of the present embodiment, the second lens unit G2 preferably has at least one positive lens component and two negative lens components. The second lens unit G2 is preferably configured so that the lens components are arranged in the order of negative, negative, and positive from the object side. The second and third lens components are preferably cemented to each other. Furthermore, a negative lens component may be added nearest to the image plane in the second lens unit G2.

In the variable magnification optical system ZL of the present embodiment, the third lens unit G3 preferably has at least one positive lens component and one negative lens component. The third lens unit G3 may be composed of a cemented lens.

The variable magnification optical system. ZL of the present embodiment may be configured as follows: the fifth lens unit G5 has positive, negative, and positive partial lens units (5a partial lens unit G5a, 5b partial lens unit G5b, and 5c partial lens unit G5c); the 5b partial lens unit G5b is moved in a substantially orthogonal direction to the optical axis, thereby achieving compensation for camera shake (vibration reduction). This configuration enables reduction in the diameter of the variable magnification optical system ZL. Preferably, the 5a partial lens unit G5a has at least one positive lens component, the 5b partial lens unit G5b has at least one cemented lens, and the 5c partial lens unit G5c has at least one negative lens component and one positive lens component.

The constituent features of the embodiment were described above in order to describe the present invention in an easily understood manner, but it is needless to mention that the present invention is by no means limited to them.

EXAMPLES

Each of examples of the present invention will be described below on the basis of the accompanying drawings. FIG. 1 shows a refractive power layout of this variable magnification optical system. ZL and states of movement of the respective lens units during change in focal length state from the wide-angle end state (W) to the telephoto end state (T). As shown in this FIG. 1, the variable magnification optical system ZL according to the present example is composed of, in order from the object side, a first lens unit G1 having a positive refractive power, a second lens unit G2 having a negative refractive power, a third lens unit G3 having a positive refractive power, a fourth lens unit G4 having a negative refractive power, and a fifth lens unit G5 having a positive refractive power. The fifth lens unit G5 is composed of, in order from the object side, a 5a partial lens unit G5a having a positive refractive power, a 5b partial lens unit G5b having a negative refractive power, and a 5c partial lens unit G5c having a positive refractive power. The variable magnification optical system ZL is configured so that in variation in magnification from the wide-angle end state to the telephoto end state, while the first lens unit G1 and the fifth lens unit G5 are fixed, the third lens unit G3 is moved along the optical axis to implement focusing from a far object to a near object and the 5b partial lens unit G5b of the fifth lens unit G5 is moved in a substantially orthogonal direction to the optical axis to implement compensation for camera shake (vibration reduction).

First Example

The variable magnification optical system ZL shown in FIG. 1 shows a configuration of a variable magnification optical system ZL1 according to the first example, and in this variable magnification optical system ZL1, the first lens unit G1 is composed of, in order from the object side, a cemented lens of a negative meniscus lens L11 with a convex surface on the object side and a positive meniscus lens L12 with a convex surface on the object side, a biconvex lens L13, and a positive meniscus lens L14 with a convex surface on the object side. The second lens unit G2 is composed of, in order from the object side, a negative meniscus lens L21 with a convex surface on the object side, a cemented lens of a biconcave lens L22 and a positive meniscus lens L23 with a convex surface on the object side, and a negative meniscus lens L24 with a concave surface on the object side. The third lens unit G3 is composed of, in order from the object side, a cemented lens of a negative meniscus lens L31 with a convex surface on the object side and a biconvex lens L32, and a biconvex lens L33. The fourth lens unit G4 is composed of a negative meniscus lens L41 with a concave surface on the object side. In the fifth lens unit G5, the 5a partial lens unit G5a is composed of, in order from the object side, a cemented lens of a negative meniscus lens L51 with a convex surface on the object side and a biconvex lens L52, the 5b partial lens unit G5b is composed of, in order from the object side, a cemented lens of a positive meniscus lens L53 with a concave surface on the object side and a biconcave lens L54, and the 5c partial lens unit G5c is composed of, in order from the object side, a cemented lens of a negative meniscus lens L55 with a convex surface on the object side and a biconvex lens L56, a positive meniscus lens L57 with a convex surface on the object side, and a negative meniscus lens L58 with a concave surface on the object side. The aperture stop S is located nearest to the object in the fifth lens unit G5 and included in the 5a partial lens unit G5a.

For compensating for rotational movement of angle θ by a lens wherein the focal length of the entire system in a wide-angle end state is f and wherein a vibration, reduction, factor (ratio of image movement amount on the image plane to movement amount of a moving lens unit in vibration compensation) is K, the moving lens unit for vibration compensation may be moved in the orthogonal direction to the optical axis by (f·tan θ)/K (this relation also applies to examples hereinafter). In the wide-angle end state in the first example, the vibration reduction factor is 1.20 and the focal length is 71.4 (mm); therefore, the movement amount of the 5b partial lens unit G5b for compensation for rotational movement of 0.40° is 0.42 (mm). In the telephoto end state in the first example, the vibration reduction factor is 1.20 and the focal length is 196.0 (mm); therefore, the movement amount of the 5b partial lens unit G5b for compensation for rotational movement of 030° is 0.86 (mm).

Table 1 below provides values of specifications of the first example. In this Table 1, f represents the focal length, FNO the F-number, and 2ω the angle of view. Furthermore, the surface number represents an order of each lens surface from the object side along the traveling direction of rays, the surface separation an axial distance from each optical surface to a next optical surface, the refractive index and Abbe number values for the d line (λ=587.6 nm), and Bf an axial distance from the last surface to the image plane I (back focus). The unit of the focal length, radius of curvature, surface separation, and other lengths in all the specification values below is generally "mm," but does not have to be limited to it because equivalent optical performance can also be achieved by proportional enlargement or proportional reduction of the optical system. It should be noted that the radius of curvature of 0.0000 indicates a plane and the refractive index of air of 1.00000 is omitted. The notation of these signs and the description of specification table also apply similarly to the examples below.

TABLE 1

| Surface Number | Radius of Curvature | Surface Separation | Abbe Number | Refractive Index |
|---|---|---|---|---|
| 1 | 207.2519 | 2.0000 | 32.35 | 1.850260 |
| 2 | 77.5141 | 9.5000 | 82.52 | 1.497820 |
| 3 | 461.0795 | 0.1000 | | |
| 4 | 96.8810 | 8.0000 | 82.52 | 1.497820 |
| 5 | −2446.3946 | 0.1000 | | |
| 6 | 74.8396 | 8.0000 | 65.46 | 1.603001 |
| 7 | 635.5296 | (d1) | | |
| 8 | 301.7367 | 2.2000 | 42.72 | 1.834807 |
| 9 | 35.0104 | 9.1179 | | |
| 10 | −83.6050 | 2.0000 | 70.41 | 1.487490 |
| 11 | 42.3925 | 6.0000 | 23.78 | 1.846660 |
| 12 | 647.2222 | 4.5999 | | |
| 13 | −49.2733 | 2.2000 | 65.46 | 1.603001 |
| 14 | −2747.7138 | (d2) | | |
| 15 | 350.7655 | 2.0000 | 28.46 | 1.728250 |
| 16 | 91.4253 | 6.5000 | 65.46 | 1.603001 |
| 17 | −94.5881 | 0.1000 | | |
| 18 | 143.9361 | 5.5000 | 65.46 | 1.603001 |
| 19 | −132.9507 | (d3) | | |
| 20 | −84.4304 | 2.5000 | 52.31 | 1.754999 |
| 21 | −211.8686 | (d4) | | |

TABLE 1-continued

| | | | | |
|---|---|---|---|---|
| 22 | 0.0000 | 1.0000 | | (stop) |
| 23 | 44.5401 | 2.0000 | 32.35 | 1.850260 |
| 24 | 30.5381 | 9.0000 | 65.46 | 1.603001 |
| 25 | −8165.2768 | 25.0000 | | |
| 26 | −197.5962 | 4.0000 | 32.35 | 1.850260 |
| 27 | −34.4924 | 2.0000 | 54.66 | 1.729157 |
| 28 | 47.2773 | 5.0000 | | |
| 29 | 147.5802 | 2.0000 | 32.35 | 1.850260 |
| 30 | 52.0642 | 6.0000 | 82.52 | 1.497820 |
| 31 | −60.9696 | 0.1000 | | |
| 32 | 37.8007 | 6.0000 | 82.52 | 1.497820 |
| 33 | 394.5473 | 5.0000 | | |
| 34 | −47.6819 | 2.0000 | 44.88 | 1.639300 |
| 35 | −113.6656 | Bf | | |

| | Wild-angle end | Intermediate focal length | Telephoto end |
|---|---|---|---|
| f = | | 71.40~135.00~196.00 | |
| F. NO = | | 2.90~2.90~2.90 | |
| ω = | | 17.118~8.939~6.137 | |
| Bf = | | 58.11630 | |

[Data of zoom lens units]

| Lens unit | Focal length |
|---|---|
| first lens unit | 92.25351 |
| second lens unit | −28.02093 |
| third lens unit | 61.31275 |
| fourth lens unit | −187.49944 |
| fifth lens unit | 111.81491 |

In this first example, an axial air space d1 between the first lens unit G1 and the second lens unit G2, an axial air space d2 between the second lens unit G2 and the third lens unit G3, an axial air space d3 between the third lens unit G3 and the fourth lens unit G4, and an axial air space d4 between the fourth lens unit G4 and the fifth lens unit G5 change in variable magnification. Table 2 below shows the variable space data and overall lengths at respective focal lengths in the wide-angle end state, an intermediate focal length state, and the telephoto end state of the variable magnification optical system ZL1 according to this first example.

TABLE 2

[Variable space data]

| | Wild-angle end | Intermediate focal length | Telephoto end |
|---|---|---|---|
| d1 | 2.000 | 23.001 | 30.816 |
| d2 | 29.816 | 15.626 | 2.943 |
| d3 | 6.617 | 14.919 | 19.787 |
| d4 | 17.113 | 2.000 | 2.000 |
| overall length | 253.180 | 253.180 | 253.180 |

Table 3 below shows the value corresponding to the condition in this first example. In this Table 3, $fG_{n-1}$ represents the focal length of the fourth lens unit G4 and fw the focal length of the entire system in a wide-angle end state of the variable magnification optical system ZL. This notation of signs also applies to the examples below.

TABLE 3

(1) $|fG_{n-1}|/fw = 2.626$

Figure 3:
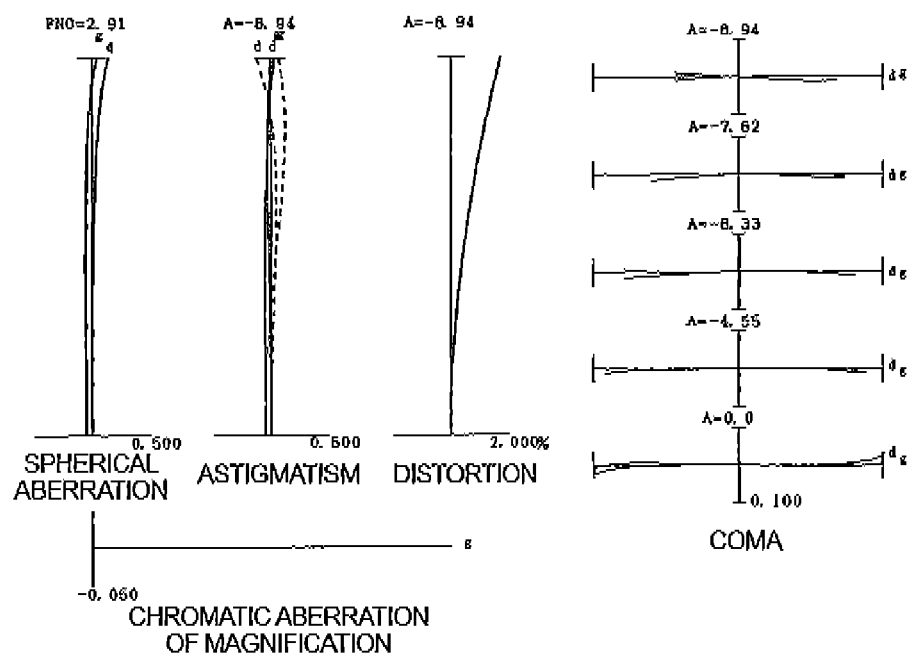
FIG. 3 is aberration diagrams in an intermediate focal length state in the first example.
Figure 5:
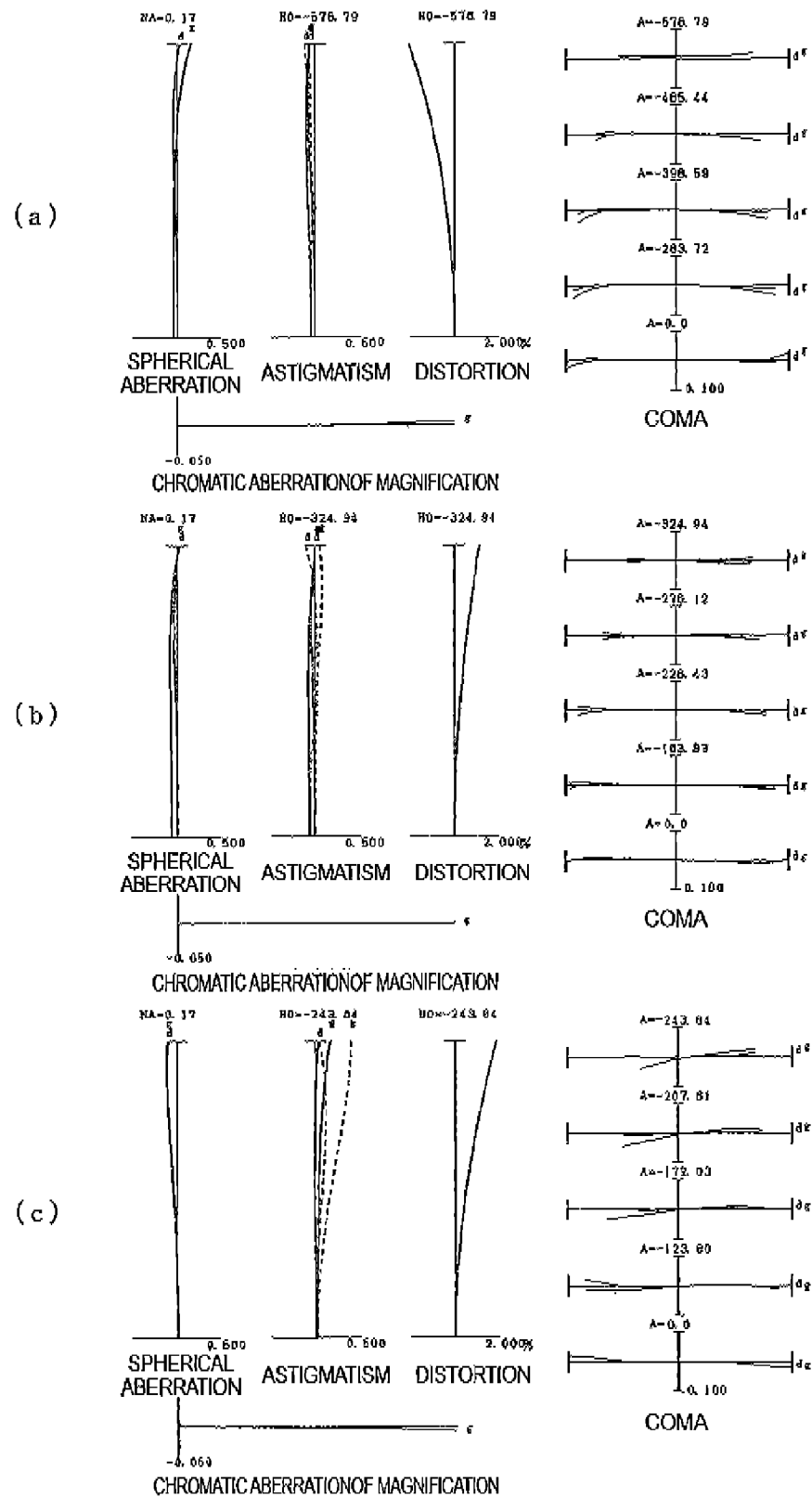
FIG. 5 is aberration diagrams in a near object in-focus state in the first example, wherein (a) is aberration diagrams in the near object in-focus state in the wide-angle end state, (b) aberration diagrams in the near object in-focus state in an intermediate focal length state, and (c) aberration diagrams in the near object in-focus state in the telephoto end state.

FIG. 2 (a) shows aberration diagrams in the infinity in-focus state in the wide-angle end state in the first example, FIG. 3 aberration diagrams in the infinity in-focus state in the intermediate focal length state, FIG. 4 (a) aberration diagrams in the infinity in-focus state in the telephoto end state, FIG. 5 (a) aberration diagrams in the near object in-focus state in the wide-angle end state, FIG. 5 (b) aberration diagrams in the near object in-focus state in the intermediate focal length state, and FIG. 5 (c) aberration diagrams in the near object in-focus state in the telephoto end state. FIG. 2 (b) shows a meridional transverse aberration diagram with a movement compensation for rotational movement of 0.40° in the infinity photography state in the wide-angle end state in the first example and FIG. 4 (b) a meridional transverse aberration diagram with a movement compensation for rotational movement of 0.30° in the infinity photography state in the telephoto end state in the first example.

In each aberration diagram, FNO represents the F-number, Y an image height, d the d line (λ=587.6 nm), and g the g line (λ=435.6 nm). In the aberration diagrams showing astigmatism, a solid line indicates a sagittal image surface and a dashed line a meridional image surface. The description of aberration diagrams also applies similarly to the examples below. As apparent from the aberration diagrams, it is seen that the variable magnification optical system of the first example is well corrected for the various aberrations in each of the focal length states from the wide-angle end state to the telephoto end state and has excellent imaging performance.

Second Example

Figure 6:
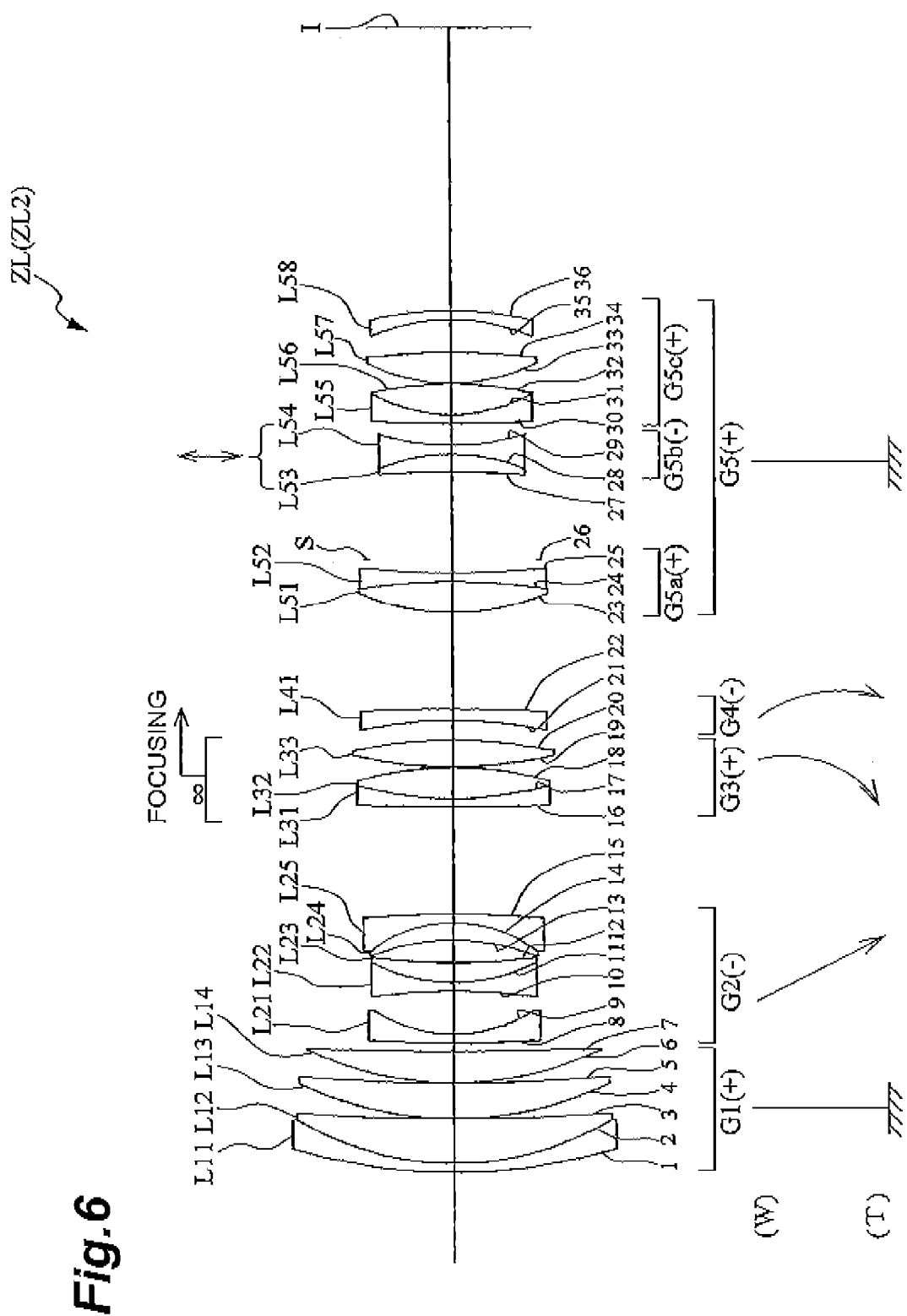
FIG. 6 is a cross-sectional view showing a configuration of a variable magnification optical system according to the second example.

FIG. 6 is a drawing showing a configuration of a variable magnification optical system ZL2 according to the second example. In this variable magnification optical system ZL2 of FIG. 6, the first lens unit G1 is composed of in order from the object side, a cemented lens of a negative meniscus lens L11 with a convex surface on the object side and a positive meniscus lens L12 with a convex surface on the object side, a positive meniscus lens L13 with a convex surface on the object side, and a positive meniscus lens L14 with a convex surface on the object side. The second lens unit G2 is composed of, in order from the object side, a negative meniscus lens L21 with a convex surface on the object side, a cemented lens of a biconcave lens L22 and a positive meniscus lens L23 with a convex surface on the object side, and a cemented lens of a positive meniscus lens L24 with a concave surface on the object side and a negative meniscus lens L25 with a concave surface on the object side. The third lens unit G3 is composed of, in order from the object side, a cemented lens of a negative meniscus lens L31 with a convex surface on the object side and a biconvex lens L32, and a biconvex lens L33. The fourth lens unit G4 is composed of a negative meniscus lens L41 with a concave surface on the object side. In the fifth lens unit G5, the 5a partial lens unit G5a is composed of, in order from the object side, a cemented lens of a biconvex lens L51 and a biconcave lens L52, the 5b partial lens unit G5b is composed of, in order from the object side, a cemented lens of a positive meniscus lens L53 with a concave surface on the object side and a biconcave lens L54, and the 5c partial lens unit G5c is composed of, in order from the object side, a cemented lens of a negative meniscus lens L55 with a convex surface on the object side and a biconvex lens L56, a biconvex lens L57, and a negative meniscus lens L58 with a concave surface on the object side. The aperture stop S is located between the 5a partial lens unit G5a and the 5b partial lens unit G5b and nearest to the image in the 5a partial lens unit G5a.

In the wide-angle end state in this second example, the vibration reduction factor is 1.00 and the focal length is 71.4 (mm); therefore, the movement amount of the 5b partial lens unit G5b for compensation for the rotational movement of 0.40° is 0.50 (mm). In the telephoto end state in the second example, the vibration reduction factor is 1.00 and the focal length is 196.0 (mm); therefore, the movement amount of the 5b partial lens unit G5b for compensation for the rotational movement of 0.30° is 1.03 (mm).

Table 4 below provides values of specifications of the second example.

TABLE 4

| Surface Number | Radius of Curvature | Surface Separation | Abbe Number | Refractive Index |
|---|---|---|---|---|
| 1 | 138.9420 | 2.0000 | 32.35 | 1.850260 |
| 2 | 74.8515 | 10.0000 | 82.52 | 1.497820 |
| 3 | 499.1083 | 0.1000 | | |
| 4 | 86.7613 | 8.0000 | 82.52 | 1.49782 |
| 5 | 437.0393 | 0.1000 | | |
| 6 | 84.2569 | 7.0000 | 82.52 | 1.497820 |
| 7 | 938.7139 | (d1) | | |
| 8 | 384.1157 | 2.0000 | 40.94 | 1.806100 |
| 9 | 35.6165 | 9.6847 | | |
| 10 | −131.1744 | 2.0000 | 70.41 | 1.487490 |
| 11 | 42.3484 | 4.5000 | 23.78 | 1.846660 |
| 12 | 163.1687 | 5.0588 | | |
| 13 | −53.5772 | 4.0000 | 22.76 | 1.808095 |
| 14 | −32.5969 | 2.0000 | 42.72 | 1.834807 |
| 15 | −234.9579 | (d2) | | |
| 16 | 510.9139 | 2.0000 | 32.35 | 1.850260 |
| 17 | 86.7071 | 7.0000 | 65.46 | 1.603001 |
| 18 | −83.2647 | 0.1000 | | |
| 19 | 103.7337 | 6.0000 | 65.46 | 1.603001 |
| 20 | −116.8560 | (d3) | | |
| 21 | −103.1415 | 2.5000 | 42.72 | 1.834807 |
| 22 | −342.0133 | (d4) | | |
| 23 | 58.8589 | 7.0000 | 42.72 | 1.834807 |
| 24 | −140.2358 | 2.0000 | 23.78 | 1.846660 |
| 25 | 198.9539 | 3.0000 | | |
| 26 | 0.0000 | 20.0000 | | (stop) |
| 27 | −183.3956 | 4.0000 | 23.78 | 1.846660 |
| 28 | −45.0249 | 2.0000 | 41.96 | 1.667551 |
| 29 | 57.8421 | 5.0000 | | |
| 30 | 383.3560 | 2.0000 | 50.23 | 1.719995 |
| 31 | 39.1251 | 7.0000 | 82.52 | 1.497820 |
| 32 | −82.1158 | 0.1000 | | |
| 33 | 45.2987 | 7.0000 | 82.52 | 1.497820 |
| 34 | −153.4974 | 7.5493 | | |
| 35 | −47.9028 | 2.0000 | 32.35 | 1.850260 |
| 36 | −82.5403 | Bf | | |

| | Wild-angle end | Intermediate focal length | Telephoto end |
|---|---|---|---|
| f = | | 71.40~135.00~196.00 | |
| F. NO = | | 2.90~2.90~2.90 | |
| ω = | | 17.086~8.942~6.142 | |
| Bf = | | 63.53948 | |

[Data of zoom lens units]

| Lens unit | Focal length |
|---|---|
| first lens unit | 98.41898 |
| second lens unit | −26.61069 |
| third lens unit | 59.32138 |
| fourth lens unit | −177.74549 |
| fifth lens unit | 114.05658 |

Table 5 below shows the variable space data and overall lengths at respective focal lengths in the wide-angle end state, intermediate focal length state, and telephoto end state of the variable magnification optical system ZL2 according to this second example.

TABLE 5

[Variable space data]

|  | Wild-angle end | Intermediate focal length | Telephoto end |
|---|---|---|---|
| d1 | 2.000 | 25.437 | 33.995 |
| d2 | 24.330 | 12.566 | 2.000 |
| d3 | 4.668 | 10.865 | 14.953 |
| d4 | 21.950 | 4.080 | 2.000 |
| overall length | 259.180 | 259.180 | 259.180 |

Table 6 below provides the value corresponding to the condition in this second example.

TABLE 6

(1) | f $G_{n-1}$ |/f w = 2.489

Figure 8:
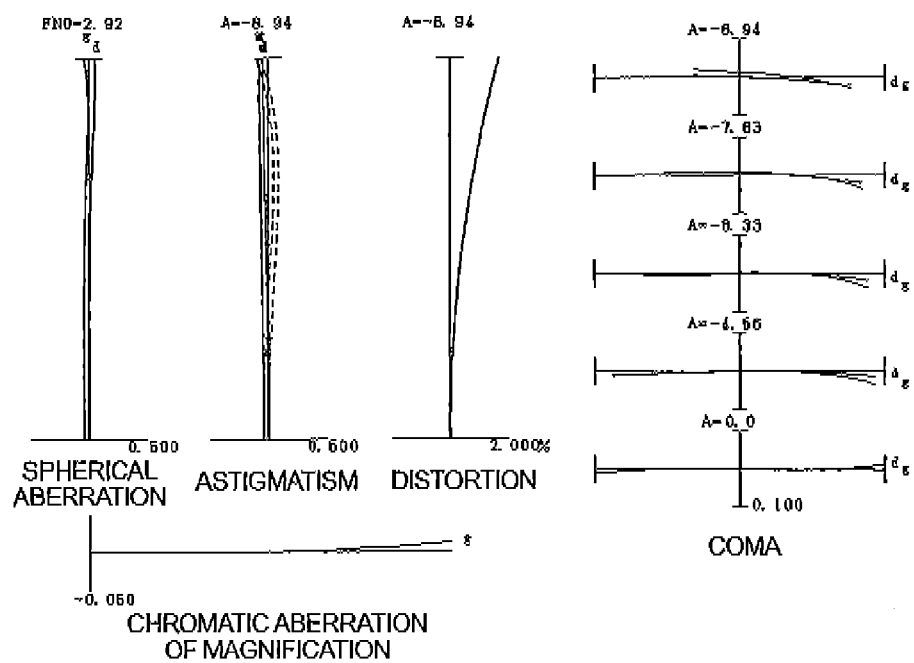
FIG. 8 is aberration diagrams in an intermediate focal length state in the second example.
Figure 10:
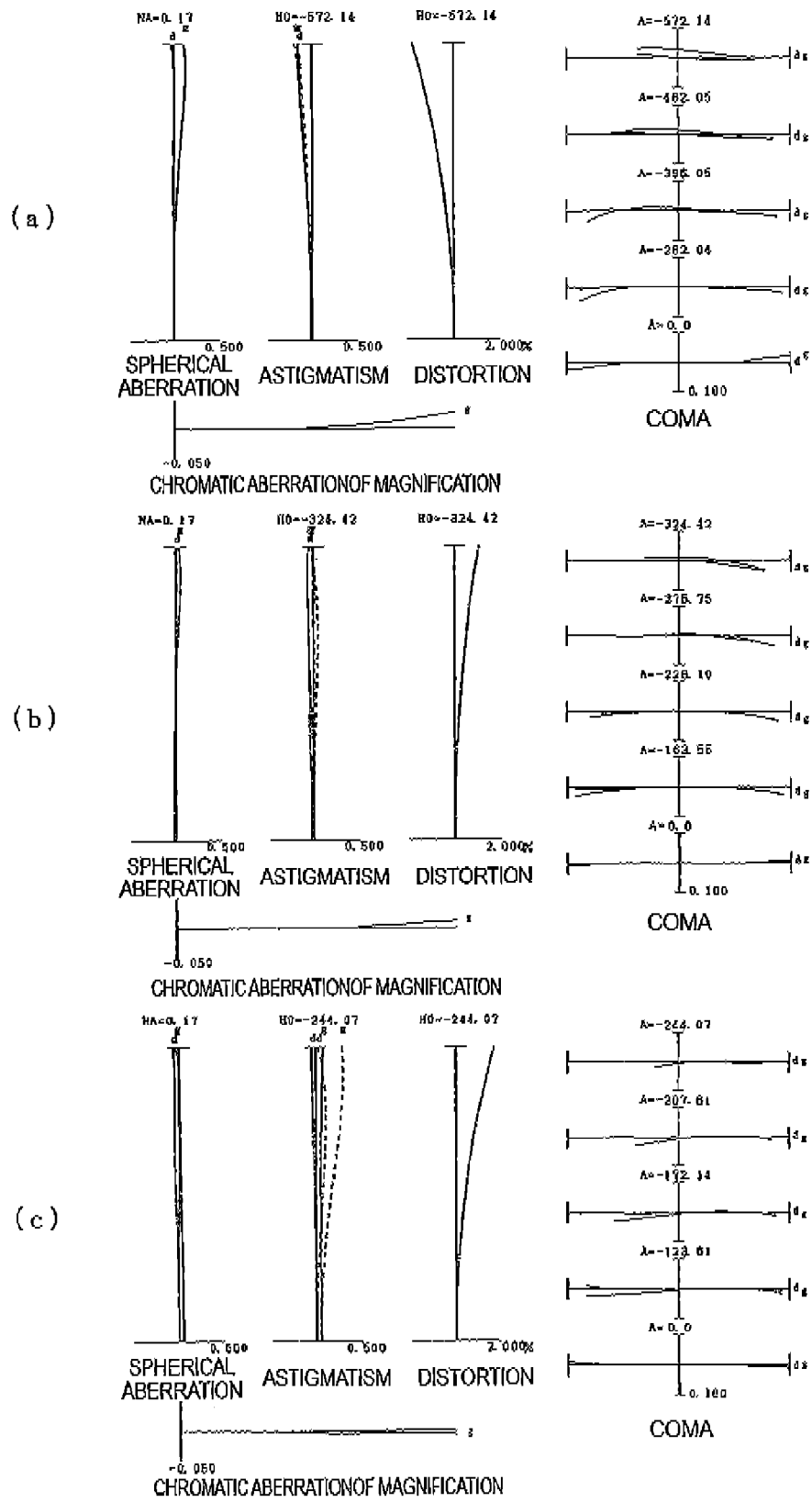
FIG. 10 is aberration diagrams in a near object in-focus state in the second example, wherein (a) is aberration diagrams in the near object in-focus state in the wide-angle end state, (b) aberration diagrams in the near object in-focus state in an intermediate focal length state, and (c) aberration diagrams in the near object in-focus state in the telephoto end state.

FIG. 7 (*a*) shows aberration diagrams in the infinity in-focus state in the wide-angle end state in the second example, FIG. 8 aberration diagrams in the infinity in-focus state in the intermediate focal length state, FIG. 9 (*a*) aberration diagrams in the infinity in-focus state in the telephoto end state, FIG. 10 (*a*) aberration diagrams in the near object in-focus state in the wide-angle end state, FIG. 10 (*b*) aberration diagrams in the near object in-focus state in the intermediate focal length state, and FIG. 10 (*c*) aberration diagrams in the near object in-focus state in the telephoto end state. FIG. 7 (*b*) shows a meridional transverse aberration diagram with a movement compensation for rotational movement of 0.40° in the infinity photography state in the wide-angle end state in the second example and FIG. 9 (*b*) a meridional transverse aberration diagram with a movement compensation for rotational movement of 0.30° in the infinity photography state in the telephoto end state in the first example. As apparent from the aberration diagrams, it is seen that the variable magnification optical system of the second example is well corrected for the various aberrations in each of the focal length states from the wide-angle end state to the telephoto end state and has excellent imaging performance.

Third Example

Figure 11:
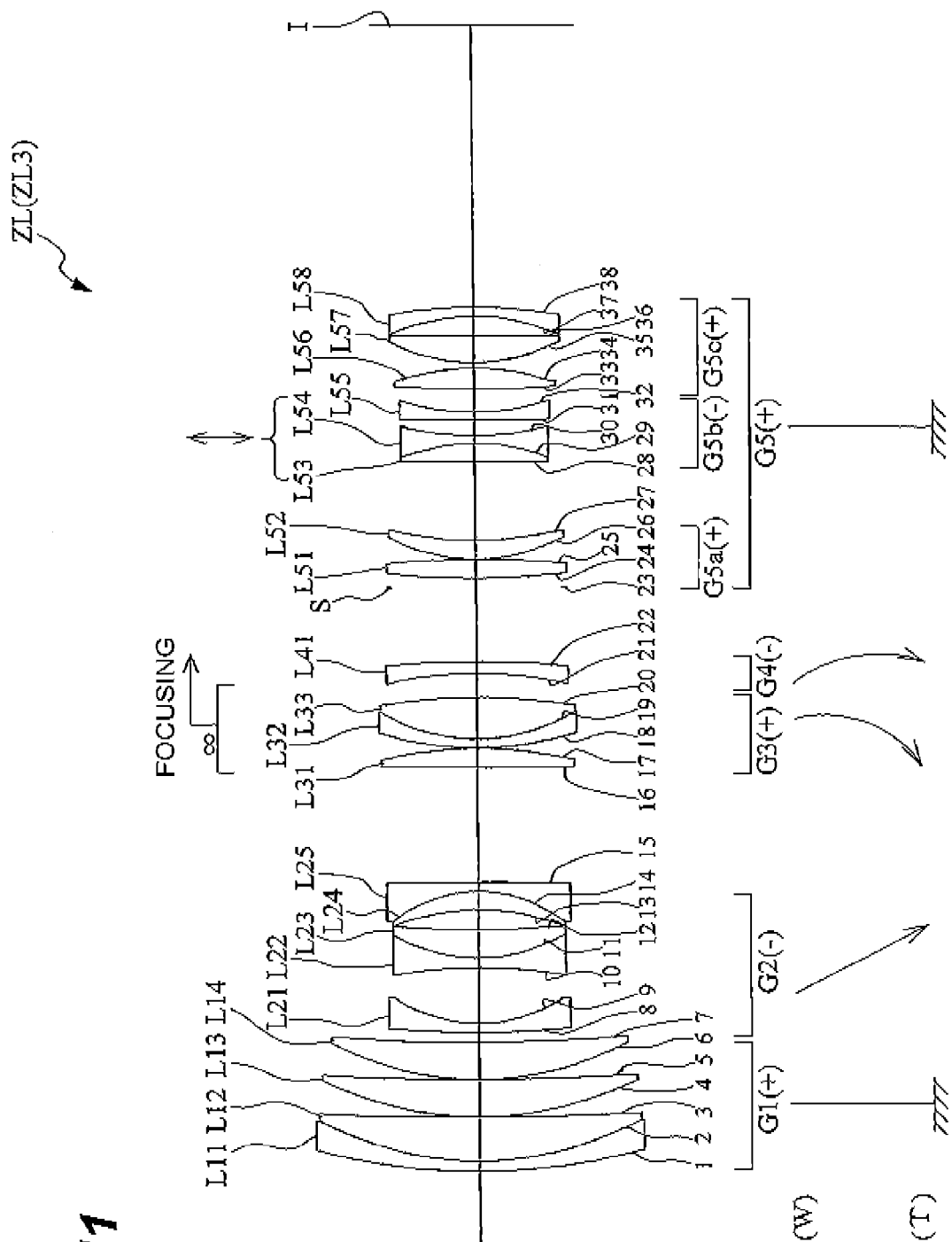
FIG. 11 is a cross-sectional view showing a configuration of a variable magnification optical system according to the third example.

FIG. 11 is a drawing showing a configuration of a variable magnification optical system ZL3 according to the third example. In this variable magnification optical system ZL3 of FIG. 11, the first lens unit G1 is composed of, in order from the object side, a cemented lens of a negative meniscus lens L11 with a convex surface on the object side and a positive meniscus lens L12 with a convex surface on the object side, a positive meniscus lens L13 with a convex, surface on the object side, and a positive meniscus lens L14 with a convex surface on the object side. The second lens unit G2 is composed of in order from the object side, a negative meniscus lens L21 with a convex surface on the object side, a cemented lens of a biconcave lens L22 and a positive meniscus lens L23 with a convex surface on the object side, and a cemented lens of a positive meniscus lens L24 with a concave surface on the object side and a negative meniscus lens L25 with a concave surface on the object side. The third lens unit G3 is composed of in order from the object side, a positive meniscus lens L31 with a concave surface on the object side, and a cemented lens of a negative meniscus lens L32 with a convex surface on the object side and a biconvex lens L33. The fourth lens unit G4 is composed of a negative meniscus lens L41 with a concave surface on the object side. In the fifth lens unit G5, the 5*a* partial lens unit G5*a* is composed of, in order from the object side, a biconvex lens L51 and a positive meniscus lens L52 with a convex surface on the object side, the 5*b* partial lens unit G5*b* is composed of in order from the object side, a cemented lens of a positive meniscus lens L53 with a concave surface on the object side and a biconcave lens L54, and a negative meniscus lens L55 with a convex surface on the object side, and the 5*c* partial lens unit G5*c* is composed of, in order from the object side, a biconvex lens L56, a biconvex lens L57, and a negative meniscus lens L58 with a concave surface on the object side. The aperture stop S is located nearest to the object in the fifth lens unit G5 and included in the 5*a* partial lens unit G5*b*.

In the wide-angle end state in this third example, the vibration reduction factor is 1.30 and the focal length is 71.4 (mm); therefore, the movement amount of the 5*b* partial lens unit G5*b* for compensation for the rotational movement of 0.40° is 0.38 (mm). In the telephoto end state in the third example, the vibration reduction factor is 1.30 and the focal length is 196.0 (mm); therefore, the movement amount of the 5*b* partial lens unit G5*b* for compensation for the rotational movement of 0.30° is 0.79 (mm).

Table 7 below provides values of specifications of the third example.

TABLE 7

| Surface Number | Radius of Curvature | Surface Separation | Abbe Number | Refractive Index | |
|---|---|---|---|---|---|
| 1 | 150.1075 | 2.2000 | 28.69 | 1.795041 | |
| 2 | 77.1608 | 9.5000 | 82.52 | 1.497820 | |
| 3 | 756.3684 | 0.1000 | | | |
| 4 | 82.5453 | 8.0000 | 82.52 | 1.497820 | |
| 5 | 581.7849 | 0.0000 | | | |
| 6 | 73.1642 | 8.0000 | 82.52 | 1.497820 | |
| 7 | 427.5813 | (d1) | | | |
| 8 | 214.3299 | 2.0000 | 42.72 | 1.834807 | |
| 9 | 33.7853 | 12.1976 | | | |
| 10 | −109.2380 | 2.0000 | 82.52 | 1.497820 | |
| 11 | 39.0214 | 6.0000 | 23.78 | 1.846660 | |
| 12 | 220.3271 | 4.2950 | | | |
| 13 | −55.0435 | 4.0000 | 25.68 | 1.784723 | |
| 14 | −31.3217 | 2.0000 | 42.72 | 1.834807 | |
| 15 | −1128.7256 | (d2) | | | |
| 16 | −4413.9629 | 4.0000 | 37.95 | 1.723420 | |
| 17 | −90.7104 | 0.1000 | | | |
| 18 | 74.5140 | 2.0000 | 22.79 | 1.808090 | |
| 19 | 42.9390 | 9.0000 | 65.46 | 1.603001 | |
| 20 | −133.3513 | (d3) | | | |
| 21 | −90.0000 | 2.5000 | 23.78 | 1.846660 | |
| 22 | −222.6096 | (d4) | | | |
| 23 | 0.0000 | 2.0000 | | | (stop) |
| 24 | 181.5274 | 4.0000 | 82.52 | 1.497820 | |
| 25 | −226.9093 | 0.1000 | | | |
| 26 | 42.1406 | 4.0000 | 82.52 | 1.497820 | |
| 27 | 81.5898 | 17.0000 | | | |
| 28 | −5404.9164 | 4.0000 | 28.46 | 1.728250 | |
| 29 | −46.9905 | 1.6000 | 53.71 | 1.579570 | |
| 30 | 64.5686 | 3.5000 | | | |
| 31 | 1040.8030 | 1.6000 | 55.52 | 1.696797 | |
| 32 | 57.6196 | 5.0000 | | | |
| 33 | 329.9937 | 4.5000 | 82.52 | 1.497820 | |
| 34 | −56.0769 | 1.1857 | | | |
| 35 | 41.0985 | 6.0000 | 82.52 | 1.497820 | |
| 36 | −1567.9225 | 4.0871 | | | |
| 37 | −49.0618 | 2.0000 | 23.78 | 1.846660 | |
| 38 | −109.7403 | Bf | | | |

| | Wild-angle end | Intermediate focal length | Telephoto end |
|---|---|---|---|
| f = | | 71.40~135.00~196.00 | |
| F. NO = | | 2.90~2.90~2.90 | |
| ω = | | 16.965~8.903~6.119 | |
| Bf = | | 60.30361 | |

TABLE 7-continued

[Data of zoom lens units]

| Lens unit | Focal length |
| --- | --- |
| first lens unit | 87.95573 |
| second lens unit | −24.08353 |
| third lens unit | 55.39945 |
| fourth lens unit | −180.00001 |
| fifth lens unit | 110.90545 |

Table 8 below shows the variable space data and overall lengths at respective focal lengths in the wide-angle end state, intermediate focal length state, and telephoto end state of the variable magnification optical system ZL3 according to this third example.

TABLE 8

[Variable space data]

|  | Wild-angle end | Intermediate focal length | Telephoto end |
| --- | --- | --- | --- |
| d1 | 2.089 | 21.088 | 27.934 |
| d2 | 24.923 | 12.762 | 2.000 |
| d3 | 5.167 | 11.520 | 15.477 |
| d4 | 16.232 | 3.041 | 3.000 |
| overall length | 247.180 | 247.180 | 247.180 |

Table 9 below provides the value corresponding to the condition in this third example.

TABLE 9

(1) $|fG_{n-1}|/fw = 2.521$

Figure 13:
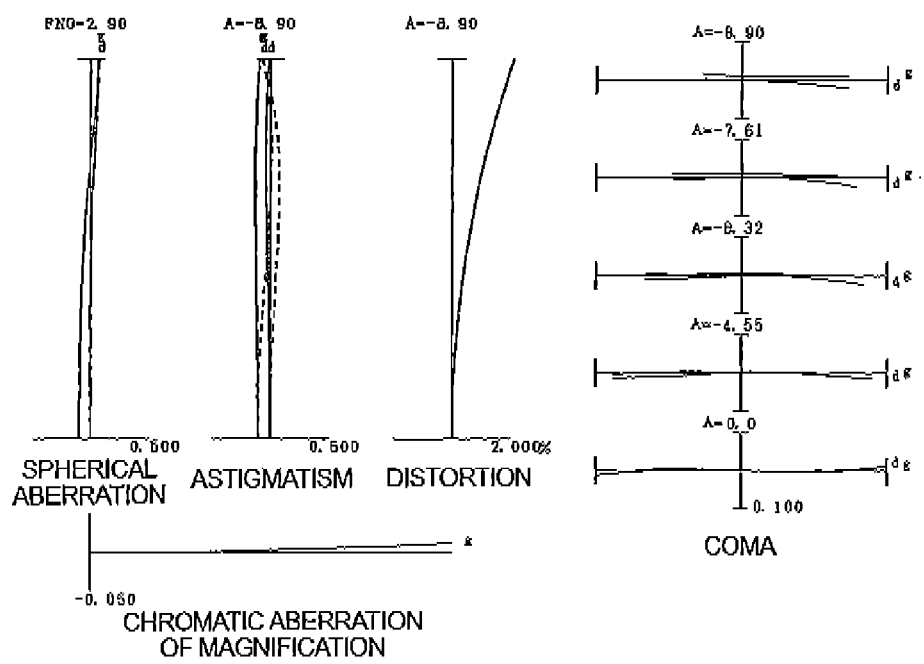
FIG. 13 is aberration diagrams in an intermediate focal length state in the third example.
Figure 15:
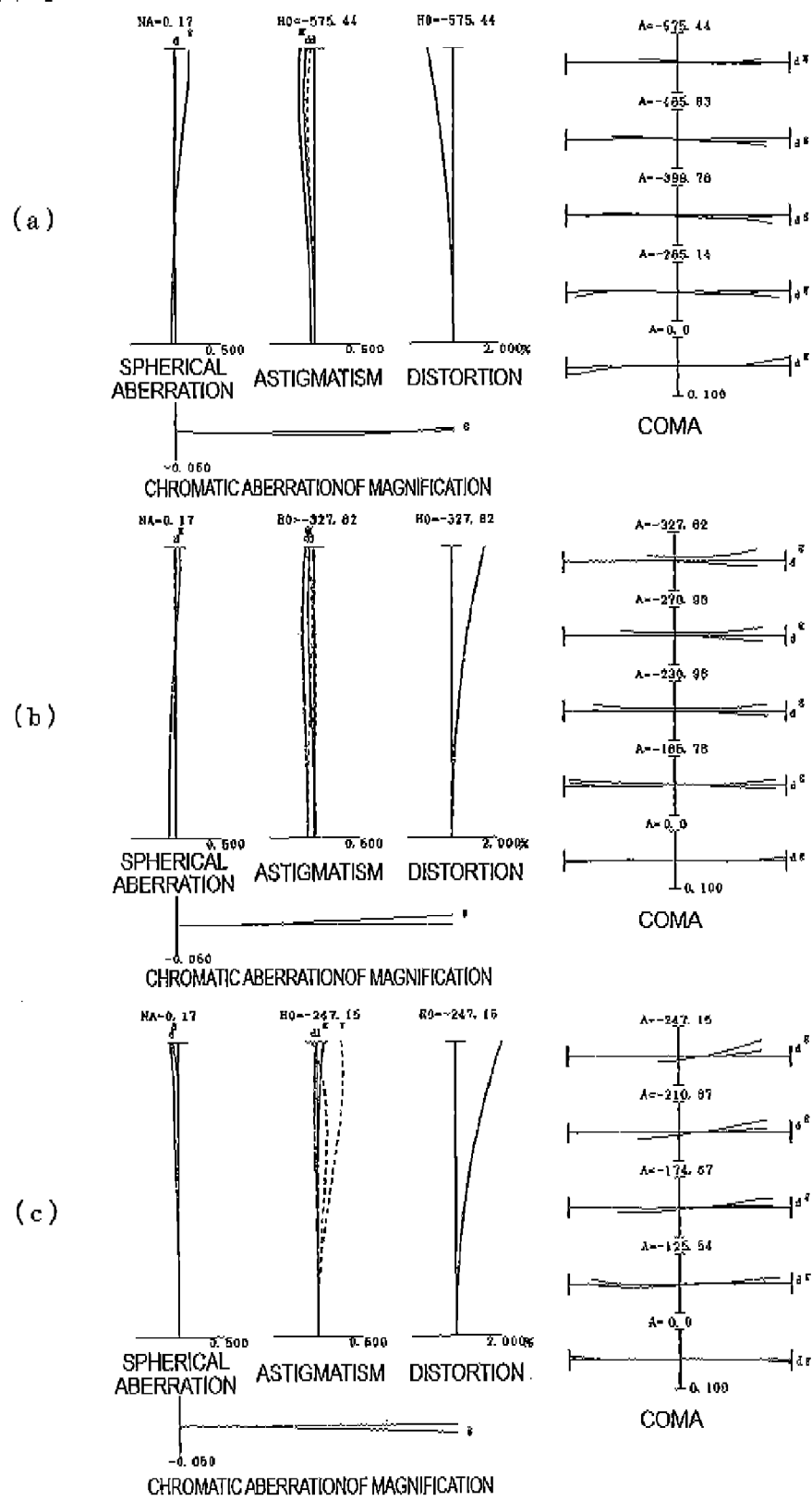
FIG. 15 is aberration diagrams in a near object in-focus state in the third example, wherein (a) is aberration diagrams in the near object in-focus state in the wide-angle end state, (b) aberration diagrams in the near object in-focus state in an intermediate focal length state, and (c) aberration diagrams in the near object in-focus state in the telephoto end state.

FIG. 12 (a) shows aberration diagrams in the infinity in-focus state in the wide-angle end state in the third example, FIG. 13 aberration diagrams in the infinity in-focus state in the intermediate focal length state, FIG. 14 (a) aberration diagrams in the infinity in-focus state in the telephoto end state, FIG. 15 (a) aberration diagrams in the near object in-focus state in the wide-angle end state, FIG. 15 (b) aberration diagrams in the near object in-focus state in the intermediate focal length state, and FIG. 15 (c) aberration diagrams in the near object in-focus state in the telephoto end state. FIG. 12 (b) shows a meridional transverse aberration diagram with a movement compensation for rotational movement of 0.40° in the infinity photography state in the wide-angle end state in the third example and FIG. 14 (b) a meridional transverse aberration diagram with a movement compensation for rotational movement of 0.30° in the infinity photography state in the telephoto end state in the third example. As apparent from the aberration diagrams, it is seen that the variable magnification optical system of the third example is well corrected for the various aberrations in each of the focal length states from the wide-angle end state to the telephoto end state and has excellent imaging performance.

Fourth Example

FIG. 18 is a drawing showing a configuration of a variable magnification optical system ZL4 according to the fourth example. This variable magnification optical system ZL4 of FIG. 18 has, in order from the object side, a first lens unit G1 having a positive refractive power, a second lens unit G2 having a negative refractive power, a third lens unit G3 having a positive refractive power, and a fourth lens unit G4 having a positive refractive power. The third lens unit G3 has, in order from the object side, a front partial lens unit G1a, and a rear partial lens unit G3b arranged with an air space to the front partial lens unit G3a. In the variable magnification optical system ZL4, during variable magnification, the first lens unit G1 and the fourth lens unit G4 are fixed, the second lens unit G2 and the third lens unit G3 move in the optical-axis direction, and an air space between the front partial tens unit G1a and the rear partial lens unit G3b varies. In the variable magnification optical system ZL4, during focusing, at least one of the front partial lens unit G3a and the rear partial lens unit G3b moves and the other is fixed. Furthermore, at least a part of the fourth lens unit G4 (negative partial lens unit G4b in the case where the fourth lens unit G4 has positive, negative, and positive partial lens units G4a, G4b, and G4c in order from the object side as in the present example) moves so as to have a component in a substantially orthogonal direction to the optical axis.

The first lens unit G1 is composed of; in order from the object side, a cemented lens of a negative meniscus lens L11 with a convex surface on the object side and a biconvex lens L12, a biconvex lens L13, and a positive meniscus lens L14 with a convex surface on the object side. The second lens unit G2 is composed of, in order from the object side, a negative meniscus lens L21 with a convex surface on the object side, a cemented lens of a biconcave lens L22 and a positive meniscus lens L23 with a convex surface on the object side, and a negative meniscus lens L24 with a concave surface on the object side. The front partial lens unit G3a of the third lens unit G3 is composed of, in order from the object side, a cemented lens of a positive meniscus lens L31 with a convex surface on the object side and a negative meniscus lens L32 with a convex surface on the object side. The rear partial lens unit G3b of the third lens unit G3 is composed of, in order from the object side, a positive meniscus lens L41 with a concave surface on the object side, and a cemented lens of a biconvex lens L42 and a biconcave lens L43. In the fourth lens unit G4, the first partial unit G4a is composed of a positive meniscus lens L51 with a convex surface on the object side, the second partial unit G4b is composed of, in order from the object side, a cemented lens of a biconvex lens L52 and a biconcave lens L53, and a biconcave lens L54, and the third partial unit G4c is composed of, in order from the object side, a biconvex lens L55, and a cemented lens of a biconvex lens L56 and a negative meniscus lens L57 with a concave surface on the object side. The closure stop S is located nearest to the object in the fourth lens unit G4 and included in the first partial unit G4a.

In the wide-angle end state in this fourth example, the vibration reduction factor is 1.00 and the focal length is 71.4 (mm); therefore, the movement amount of the second partial unit G5b for compensation for the rotational movement of 0.40° is 0.50 (mm). In the intermediate focal length state in the fourth example, the vibration reduction factor is 1.00 and the focal length is 135.0 (mm); therefore, the movement amount of the second partial unit G6b for compensation for the rotational movement of 0.30° is 0.71 (mm). In the telephoto end state in the fourth example, the vibration reduction factor is 1.00 and the focal length is 196.0 (mm); therefore, the movement amount of the second partial unit G5b for compensation for the rotational movement of 0.30° is 1.03 (mm).

Table 13 below provides values of specifications of this fourth example.

TABLE 13

| Surface Number | Radius of Curvature | Surface Separation | Abbe Number | Refractive Index | |
|---|---|---|---|---|---|
| 1 | 547.8686 | 2.0000 | 32.35 | 1.850260 | |
| 2 | 127.0457 | 9.0000 | 82.52 | 1.497820 | |
| 3 | −387.4049 | 0.1000 | | | |
| 4 | 101.3137 | 8.0000 | 82.52 | 1.497820 | |
| 5 | −1800.9098 | 0.1000 | | | |
| 6 | 66.1166 | 8.0000 | 82.52 | 1.497820 | |
| 7 | 235.5025 | (d1) | | | |
| 8 | 106.3241 | 2.0000 | 37.16 | 1.834000 | |
| 9 | 30.3987 | 0.1000 | | | |
| 10 | −72.3427 | 2.0000 | 70.41 | 1.487490 | |
| 11 | 37.6638 | 5.5000 | 23.78 | 1.846660 | |
| 12 | 303.0536 | 4.1346 | | | |
| 13 | −44.9339 | 2.0000 | 65.46 | 1.603001 | |
| 14 | −1269.0712 | (d2) | | | |
| 15 | 69.3815 | 4.0000 | 47.93 | 1.717004 | |
| 16 | 227.8818 | 2.0000 | 42.72 | 1.834807 | |
| 17 | 63.6840 | (d3) | | | |
| 18 | −274.5014 | 4.0000 | 42.24 | 1.799520 | |
| 19 | −75.2662 | 0.1000 | | | |
| 20 | 74.6839 | 8.0000 | 65.46 | 1.603001 | |
| 21 | −55.3310 | 2.0000 | 32.35 | 1.850260 | |
| 22 | 4084.7965 | (d4) | | | |
| 23 | 0.0000 | 2.0000 | | | (aperture stop S) |
| 24 | 51.4321 | 5.0000 | 82.52 | 1.497820 | |
| 25 | 2335.6701 | 20.0000 | | | |
| 26 | 213.2867 | 4.0000 | 23.78 | 1.846660 | |
| 27 | −57.2867 | 1.5000 | 31.07 | 1.688931 | |
| 28 | 116.1082 | 2.5000 | | | |
| 29 | −213.4066 | 1.5000 | 46.47 | 1.582670 | |
| 30 | 567.4789 | 5.0000 | | | |
| 31 | 146.7888 | 4.0000 | 69.98 | 1.518601 | |
| 32 | −72.6641 | 0.6223 | | | |
| 33 | 84.7129 | 9.0000 | 52.31 | 1.517420 | |
| 34 | −32.2458 | 2.0000 | 32, −35 | 1.850260 | |
| 35 | −265.8952 | (Bf) | | | |

| | Wild-angle end | Intermediate focal length | Telephoto end |
|---|---|---|---|
| f = | | 71.40~135.00~196.00 | |
| F. NO = | | 2.91~2.91~2.91 | |
| ω = | | 16.69~8.79~6.06 | |

[Data of zoom lens units]

| Lens unit | Focal length |
|---|---|
| first lens unit | 93.218 |
| second lens unit | −26.822 |
| third lens unit | 59448.564 |
| fourth lens unit | 86.438 |
| fifth lens unit | 119.455 |

In this fourth example, an axial air space D1 between the first lens unit G1 and the second lens unit G2, an axial air space d2 between the second lens unit G2 and the third lens unit G3, an axial air space d3 between the front partial lens unit G1a and the rear partial lens unit G3b of the third lens unit G3, and an axial air space d4 between the third lens unit G3 and the fourth lens unit G4 change in variable magnification. Table 14 below shows the variable space data, Bf, and overall lengths at respective focal lengths in the wide-angle end state, intermediate focal length state, and telephoto end state of the variable magnification optical system ZL4 according to this fourth example.

TABLE 14

[Variable space data]

| | Wild-angle end | Intermediate focal length | Telephoto end |
|---|---|---|---|
| d1 | 2.683 | 24.724 | 32.437 |
| d2 | 24.804 | 16.117 | 2.000 |
| d3 | 9.527 | 4.934 | 5.838 |
| d4 | 17.138 | 8.376 | 13.875 |
| Bf | 72.476 | 72.476 | 72.476 |
| overall length | 259.180 | 259.180 | 259.180 |

Figure 20:
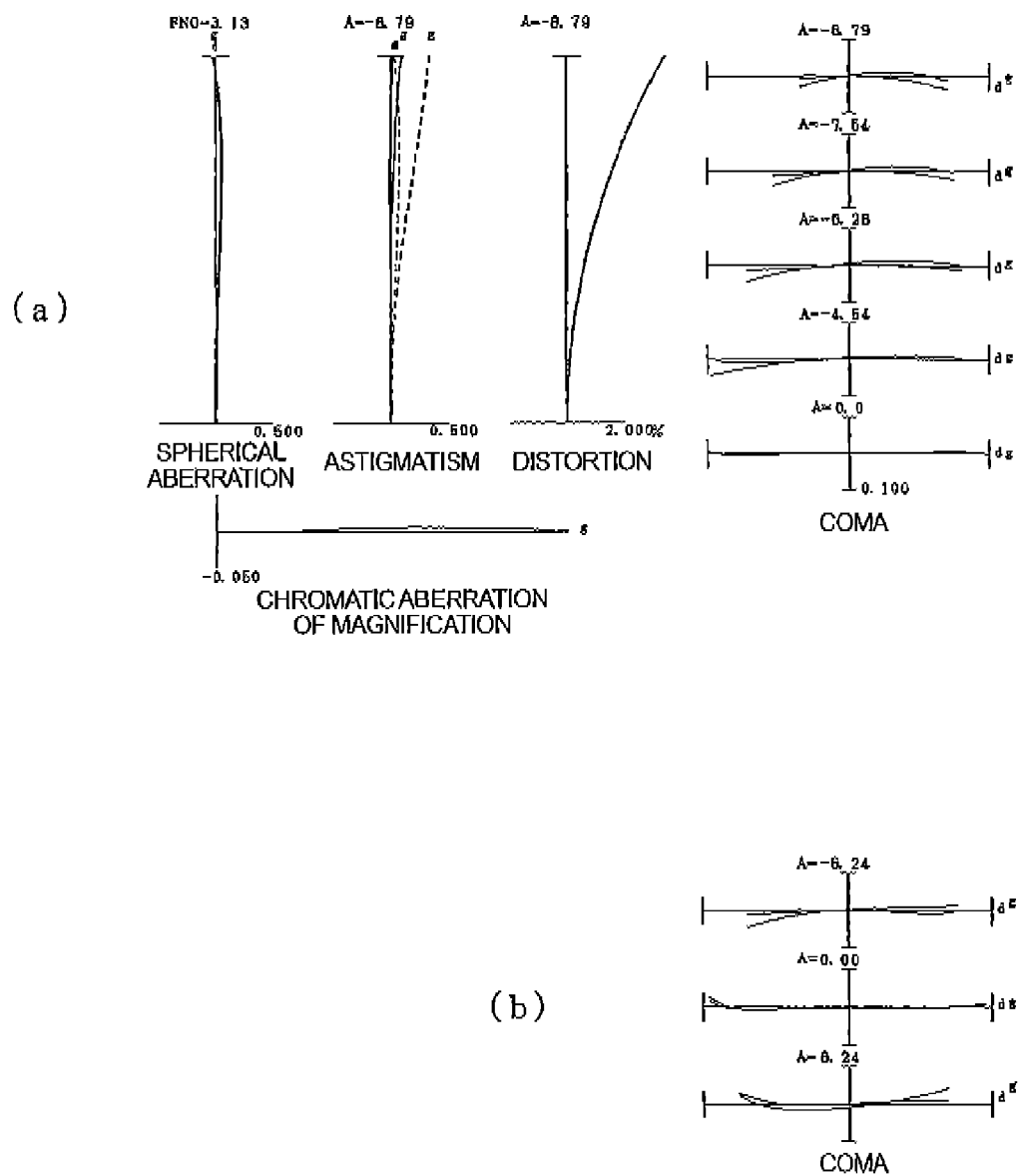
FIG. 20 is aberration diagrams in the infinity in-focus state in the fourth example, wherein (a) is aberration diagrams in an intermediate focal length state and (b) a meridional transverse aberration diagram with a movement compensation for rotational movement of 0.30° in the infinity photography state in the intermediate focal length state.
Figure 22:
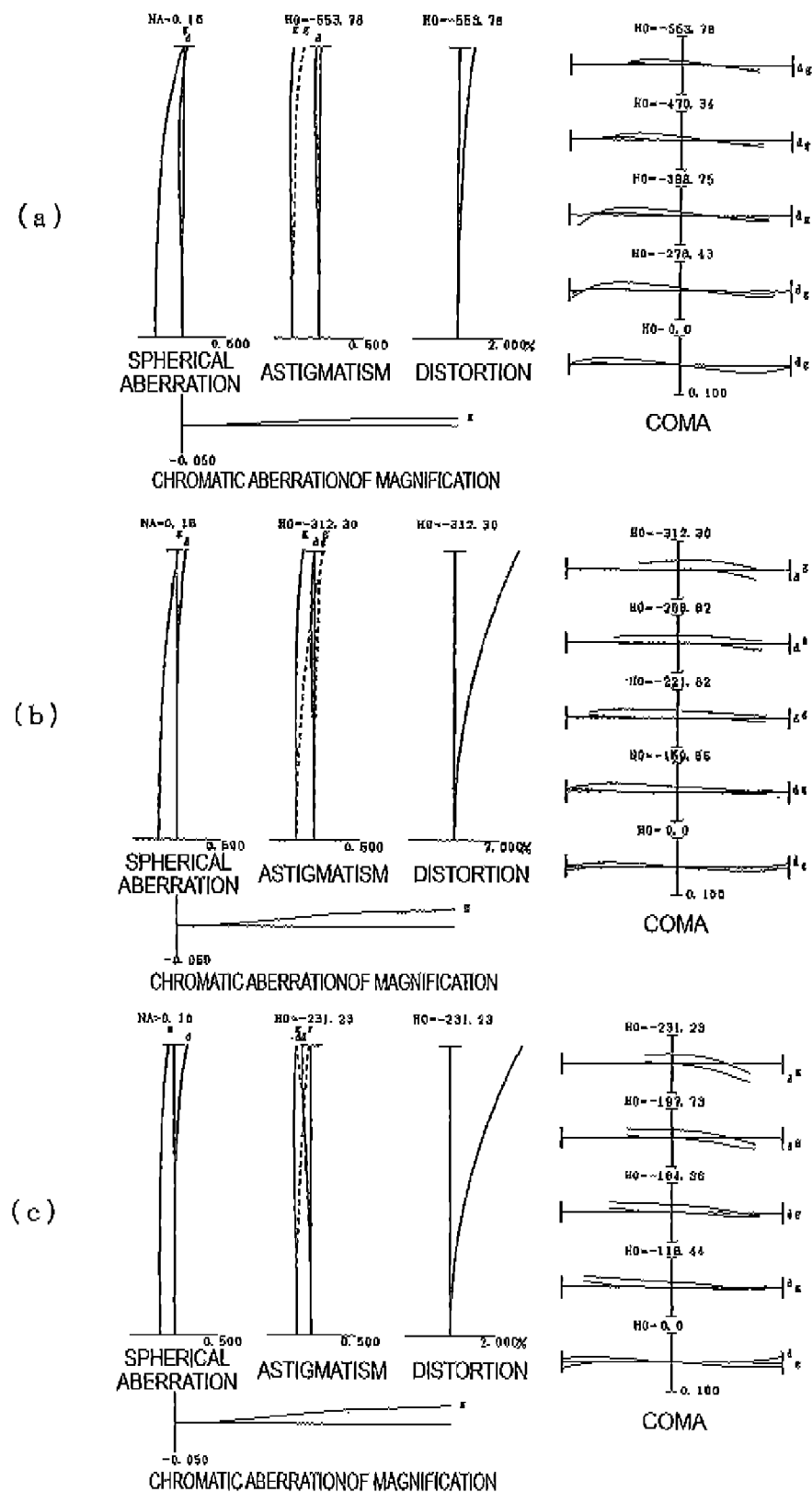
FIG. 22 is aberration diagrams in a near object in-focus state in the fourth example, wherein (a) is aberration diagrams in the near object in-focus state in the wide-angle end state, (b) aberration diagrams in the near object in-focus state in an intermediate focal length state, and (c) aberration diagrams in the near object in-focus state in the telephoto end state.

FIG. 19 (a) shows aberration diagrams in the infinity in-focus state in the wide-angle end state in the fourth example, FIG. 20 (a) aberration diagrams in the infinity in-focus state in the intermediate focal length state, FIG. 21 (a) aberration diagrams in the infinity in-focus state in the telephoto end state, FIG. 22 (a) aberration diagrams in the near object in-focus state in the wide-angle end state, FIG. 22 (b) aberration diagrams in the near object in-focus state in the intermediate focal length state, and FIG. 22 (c) aberration diagrams in the near object in-focus state in the telephoto end state. FIG. 19 (b) shows a meridional transverse aberration diagram with a movement compensation for the rotational movement of 0.40° in the infinity in-focus state in the wide-angle end state in the fourth example, FIG. 20 (b) a meridional transverse aberration diagram with a movement compensation for the rotational movement of 0.30° in the infinity in-focus state in the intermediate focal length state in the fourth example, and FIG. 21 (b) a meridional transverse aberration diagram with a movement compensation for the rotational movement of 0.30° in the infinity in-focus state in the telephoto end state in the fourth example. As apparent from the aberration diagrams, it is seen that the variable magnification optical system of the fourth example is well corrected for the various aberrations in each of the focal length states from the wide-angle end state to the telephoto end state and has excellent imaging performance.

LIST OF REFERENCE SIGNS

ZL (ZL1-ZL4) variable magnification optical system
G1 first lens unit
G2 second Jens unit
G3 third lens unit
G4 fourth lens unit
G5 fifth lens unit
G5a 5a partial lens unit
G5b 5b partial lens unit
G5c 5c partial lens unit
S aperture stop
1 electronic still camera (optical apparatus)

The invention claimed is:
1. A variable magnification optical system comprising:
a first lens unit arranged nearest to an object and having a positive refractive power;
a second lens unit arranged on the image plane side of the first lens unit;
a $G_n$ lens unit arranged nearest to the image plane;
a $G_{n-1}$ lens unit arranged on the object side of the $G_n$ lens unit; an aperture stop arranged near or in the $G_n$ lens unit; and
at least one lens unit arranged between the second lens unit and the $G_{n-1}$ lens unit,
wherein, in variable magnification, the first lens unit and the $G_n$ lens unit are fixed, wherein, in focusing, at least one lens unit arranged between the second lens unit and the $G_{n-1}$ lens unit moves, and wherein at least a part of the $G_n$ lens unit moves so as to have a component in a substantially orthogonal direction to the optical axis.

2. The variable magnification optical system according to claim 1, satisfying a condition of the following expression:

$$0.5<|fG_{n-1}|/fw<5.0,$$

where $fG_{n-1}$ is the focal length of the $G_{n-1}$ lens unit and fw the focal length of the entire system in a wide-angle end state.

3. The variable magnification optical system according to claim 1, comprising, in order from the object side, the first lens unit, the second lens unit, a third lens unit, a fourth lens unit, and a fifth lens unit.

4. The variable magnification optical system according to claim 3, wherein the fourth lens unit consists of a lens component.

5. The variable magnification optical system according to claim 3, wherein the fourth lens unit consists of a negative meniscus lens.

6. The variable magnification optical system according to claim 3, wherein the fourth lens unit consists of a lens.

7. An optical apparatus comprising the variable magnification optical system as set forth in claim 1.

8. The variable magnification optical system according to claim 1, wherein the $G_{n-1}$ lens unit consists of a lens.

9. The variable magnification optical system according to claim 1, satisfying a condition of the following expression:

$$2.489 \leq |fG_{n-1}|/fw<5.0,$$

where fGn−1 is the focal length of the $G_{n-1}$ lens unit and fw is the focal length of the entire system in a wide-angle end state.

10. The variable magnification optical system according to claim 1, wherein the $G_n$ lens unit comprises, in order from the object side, a front lens unit, a middle lens unit, and a rear lens unit, and wherein the middle lens unit moves so as to have a component in a substantially orthogonal direction to the optical axis.

11. The variable magnification optical system according to claim 1, wherein the $G_n$ lens unit comprises, in order from the object side, a front lens unit having a positive refractive power, a middle lens unit having a negative refractive power, and a rear lens unit having a positive refractive power, and wherein the middle lens unit moves so as to have a component in a substantially orthogonal direction to the optical axis.

12. The variable magnification optical system according to claim 1, wherein the first lens unit is configured without any path bending element.

13. A method for variable magnification, comprising:
providing a variable magnification optical system comprising: a first lens unit with a positive refractive power arranged nearest to an object; a second lens unit arranged on the image plane side of the first lens unit; a $G_n$ lens unit which is arranged nearest to the image plane and at least a part of which moves so as to have a component in a substantially orthogonal direction to the optical axis; a $G_{n-1}$ lens unit arranged on the object side of the $G_n$ lens unit; an aperture stop arranged near or in the $G_n$ lens unit; and a focusing lens unit arranged between the second lens unit and the $G_{n-1}$ lens unit;
fixing the first lens unit and the $G_n$ lens unit; and moving at least one lens unit arranged between the first lens unit and the $G_n$ lens unit.

14. A variable magnification optical system comprising:
a first lens unit arranged nearest to an object and having a positive refractive power;
a second lens unit arranged on the image plane side of the first lens unit;
a $G_n$ lens unit arranged nearest to the image plane, the Gn lens unit having a positive refractive power;
a $G_{n-1}$ lens unit arranged on the object side of the $G_n$ lens unit; and
at least one lens unit arranged between the second lens unit and the $G_{n-1}$ lens unit,
wherein, in variable magnification, the first lens unit and the $G_n$ lens unit are fixed,
wherein, in focusing, at least one lens unit arranged between the second lens unit and the $G_{n-1}$ lens unit moves, and
wherein the $G_n$ lens unit has only a part thereof which moves so as to have a component in a substantially orthogonal direction to the optical axis.

15. The variable magnification optical system according to claim 14, satisfying a condition of the following expression:

$$0.5<|fG_{n-1}|/fw<5.0,$$

where $fG_{n-1}$ is the focal length of the $G_{n-1}$ lens unit and fw the focal length of the entire system in a wide-angle end state.

16. The variable magnification optical system according to claim 14, comprising, in order from the object side, the first lens unit, the second lens unit, a third lens unit, a fourth lens unit, and a fifth lens unit.

17. A variable magnification optical system comprising:
a first lens unit arranged nearest to an object and having a positive refractive power;
a second lens unit arranged on the image plane side of the first lens unit;
a $G_n$ lens unit arranged nearest to the image plane, the Gn lens unit having a positive refractive power;
a $G_{n-1}$ lens unit arranged on the object side of the $G_n$ lens unit; and
at least one lens unit arranged between the second lens unit and the $G_{n-1}$ lens unit,
wherein, in variable magnification, the first lens unit and the $G_n$ lens unit are fixed,
wherein, in focusing, at least one lens unit arranged between the second lens unit and the $G_{n-1}$ lens unit moves, and
wherein at least a part of the $G_n$ lens unit moves so as to have a component in a substantially orthogonal direction to the optical axis,
the variable magnification optical system satisfying a condition of the following expression:

$$1.5<|fG_{n-1}|/fw<5.0,$$

where $fG_{n-1}$ is the focal length of the $G_{n-1}$ lens unit and fw the focal length of the entire system in a wide-angle end state.

18. The variable magnification optical system according to claim 17, comprising, in order from the object side, the first lens unit, the second lens unit, a third lens unit, a fourth lens unit, and a fifth lens unit.

19. The variable magnification optical system according to claim 17, wherein the $G_{n-1}$ lens unit consists of a lens.

20. A variable magnification optical system comprising:
a first lens unit arranged nearest to an object and having a positive refractive power;

a second lens unit arranged on the image plane side of the first lens unit;
a $G_n$ lens unit arranged nearest to the image plane;
a $G_{n-1}$ lens unit arranged on the object side of the $G_n$ lens unit; and
at least one lens unit arranged between the second lens unit and the $G_{n-1}$ lens unit,
wherein, in variable magnification, the first lens unit and the $G_n$ lens unit are fixed,
wherein, in focusing, at least one lens unit arranged between the second lens unit and the $G_{n-1}$ lens unit moves,
wherein at least a part of the $G_n$ lens unit moves so as to have a component in a substantially orthogonal direction to the optical axis,
wherein the variable magnification optical system comprises, in order from the object side, the first lens unit, the second lens unit, a third lens unit, a fourth lens unit, and a fifth lens unit, and
wherein the fourth lens unit consists of a lens.

21. The variable magnification optical system according to claim 20, wherein the fourth lens unit consists of a negative meniscus lens.

22. A method for variable magnification, comprising:
providing a variable magnification optical system comprising: a first lens unit with a positive power arranged nearest to an object; a second lens unit arranged on the image plane side of the first lens unit; a $G_n$ lens unit with a positive refractive power which is arranged nearest to the image plane and a part of which moves so as to have a component in a substantially orthogonal direction to the optical axis; a $G_{n-1}$ lens unit arranged on the object side of the $G_n$ lens unit; and a focusing lens unit arranged between the second lens unit and the $G_{n-1}$ lens unit;
fixing the first lens unit and the $G_n$ lens unit; and
moving at least one lens unit arranged between the first lens unit and the $G_n$ lens unit.

23. A method for variable magnification, comprising:
providing a variable magnification optical system comprising: a first lens unit with a positive refractive power arranged nearest to an object; a second lens unit arranged on the image plane side of the first lens unit; a $G_n$ lens unit with a positive refractive power which is arranged nearest to the image plane and at least a part of which moves so as to have a component in a substantially orthogonal direction to the optical axis; a $G_{n-1}$ lens unit arranged on the object side of the $G_n$ lens unit; and a focusing lens unit arranged between the second lens unit and the $G_{n-1}$ lens unit,
the method comprising:
fixing the first lens unit and the $G_n$ lens unit;
moving at least one lens unit arranged between the first lens unit and the $G_n$ lens unit; and
satisfying a condition of the following expression:

$$1.5 < |fG_{n-1}|/fw < 5.0,$$

where $fG_{n-1}$ is the focal length of the $G_{n-1}$ lens unit and fw the focal length of the entire system in a wide-angle end state.

24. A method for variable magnification, comprising:
providing a variable magnification optical system comprising: a first lens unit with a positive refractive power arranged nearest to an object; a second lens unit arranged on the image plane side of the first lens unit; a $G_n$ lens unit which is arranged nearest to the image plane and at least a part of which moves so as to have a component in a substantially orthogonal direction to the optical axis; a $G_{n-1}$ lens unit arranged on the object side of the $G_n$ lens unit; and a focusing lens unit arranged between the second lens unit and the $G_{n-1}$ lens unit, the variable magnification optical system comprising, in order from the object side, the first lens unit, the second lens unit, a third lens unit, a fourth lens unit, and a fifth lens unit, the fourth lens unit consisting of a lens;
fixing the first lens unit and the $G_n$ lens unit; and
moving at least one lens unit arranged between the first lens unit and the $G_n$ lens unit.

* * * * *